US012640159B2

(12) United States Patent     (10) Patent No.:   US 12,640,159 B2

Hirose                (45) Date of Patent:     May 26, 2026

(54) VOICE SIGNAL PROCESSING DEVICE, VOICE SIGNAL PROCESSING METHOD, AND NON-TRANSITORY COMPUTER READABLE RECORDING MEDIUM STORING VOICE SIGNAL PROCESSING PROGRAM

(71) Applicant: Panasonic Intellectual Property Corporation of America, Torrance, CA (US)

(72) Inventor: Yoshifumi Hirose, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 143 days.

(21) Appl. No.: 18/788,501

(22) Filed: Jul. 30, 2024

(65) Prior Publication Data

US 2024/0386901 A1     Nov. 21, 2024

Related U.S. Application Data

(63) Continuation of application No. PCT/JP2023/001863, filed on Jan. 23, 2023.

(30) Foreign Application Priority Data

Feb. 2, 2022    (JP) ................................. 2022-015144

(51) Int. Cl.
    *G10L 21/0216*      (2013.01)
    *G06V 40/10*       (2022.01)
    (Continued)

(52) U.S. Cl.
    CPC ........ *G10L 21/0216* (2013.01); *G06V 40/103* (2022.01); *H04M 9/082* (2013.01);
    (Continued)

(58) Field of Classification Search
    CPC ....... G10L 21/0216; G10L 2021/02082; G10L 2021/02166; G10L 21/0208; G10L 25/51;
    (Continued)

(56) References Cited

U.S. PATENT DOCUMENTS 9,818,425 B1 * 11/2017 Ayrapetian .......... G10L 21/0224
11,258,478 B1 * 2/2022 Kandadai .............. H04M 9/082
(Continued)

FOREIGN PATENT DOCUMENTS

| JP | 2012-216998 | 11/2012 |
| JP | 2014-110554 | 6/2014 |
| JP | 2019-75748 | 5/2019 |

OTHER PUBLICATIONS

International Search Report issued Apr. 4, 2023 in corresponding International Application No. PCT/JP2023/001863.
(Continued)

*Primary Examiner* — Fariba Sirjani
(74) *Attorney, Agent, or Firm* — Wenderoth, Lind & Ponack, L.L.P.

(57)           ABSTRACT

A voice signal processing device detects a near-end talker included in an image, specifies a direction in which the near-end talker is located, detects a voice arrival direction based on a voice signal collected by a microphone array, estimates whether the near-end talker is uttering, based on the direction in which the near-end talker is located and the voice arrival direction, sets an amplification factor of the voice signal to a value equal to or greater than 1 in a case where the near-end talker is estimated to be uttering, sets the amplification factor of the voice signal to a value smaller than 1 in a case where the near-end talker is estimated not to be uttering, and adjusts a level of the voice signal based (Continued)

on the set amplification factor, and outputs the adjusted voice signal as a transmission signal to be transmitted to a far-end talker.

10 Claims, 13 Drawing Sheets

(51) Int. Cl.
      *G10L 21/0208*       (2013.01)
      *H04M 9/08*          (2006.01)
(52) U.S. Cl.
      CPC .............. *G10L 2021/02082* (2013.01); *G10L 2021/02166* (2013.01)
(58) Field of Classification Search
      CPC ..... G10L 25/84; G10L 21/034; G06V 40/103; H04M 9/082; H04R 3/005; H04R 1/406; H04R 3/02
      See application file for complete search history.

(56)                    References Cited

U.S. PATENT DOCUMENTS

2012/0249785 A1 *  10/2012  Sudo ..................... H04M 9/082
                                                        381/80
2013/0013303 A1 *   1/2013  Strommer ........... G10L 21/0208
                                                        704/226
2021/0350823 A1 *  11/2021  Wexler ................... G10L 15/07
2022/0114995 A1 *   4/2022  Kuthuru .................. G01H 7/00
2024/0292164 A1 *   8/2024  Rohde ................. H04R 25/505
2024/0386901 A1 *  11/2024  Hirose .................. H04R 3/005

OTHER PUBLICATIONS

Extended European Search Report issued Feb. 3, 2025 in the corresponding European Patent Application No. 23749570.0.

* cited by examiner

FIG.9

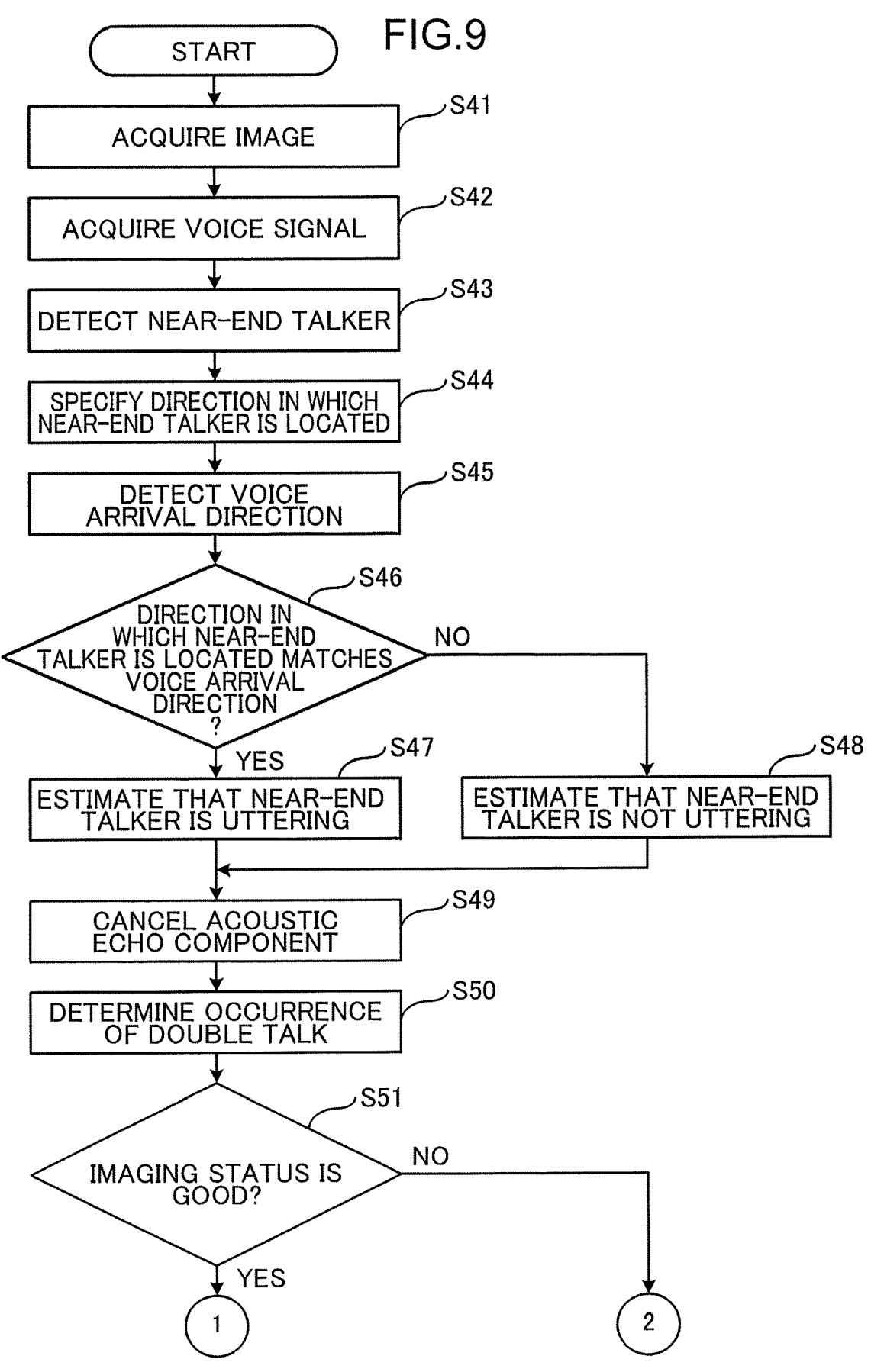

START

ACQUIRE IMAGE ⟋S41

ACQUIRE VOICE SIGNAL ⟋S42

DETECT NEAR-END TALKER ⟋S43

SPECIFY DIRECTION IN WHICH
NEAR-END TALKER IS LOCATED ⟋S44

DETECT VOICE
ARRIVAL DIRECTION ⟋S45

DIRECTION IN
WHICH NEAR-END
TALKER IS LOCATED MATCHES
VOICE ARRIVAL
DIRECTION
? ⟋S46

NO

YES

ESTIMATE THAT NEAR-END
TALKER IS UTTERING ⟋S47

ESTIMATE THAT NEAR-END
TALKER IS NOT UTTERING ⟋S48

CANCEL ACOUSTIC
ECHO COMPONENT ⟋S49

DETERMINE OCCURRENCE
OF DOUBLE TALK ⟋S50

IMAGING STATUS IS
GOOD? ⟋S51

NO

YES

1

2

VOICE SIGNAL PROCESSING DEVICE, VOICE SIGNAL PROCESSING METHOD, AND NON-TRANSITORY COMPUTER READABLE RECORDING MEDIUM STORING VOICE SIGNAL PROCESSING PROGRAM

FIELD OF INVENTION

The present disclosure relates to a technique for processing a voice signal acquired by a microphone array.

BACKGROUND ART

Conventionally, there exists an amplifying two-way call system using a microphone and a speaker. In such an amplifying two-way call system, an echo canceller that suppresses an acoustic echo is used.

In the amplifying two-way call system, a near-end talker and a far-end talker simultaneously utter, and their voices overlap each other, which may cause a phenomenon called double talk. In a case where the voice of the near-end talker and the voice of the far-end talker output from the speaker are simultaneously input to the microphone, a residual echo may occur or the voices may be interrupted.

Therefore, for example, in a hands-free call device disclosed in Patent Literature 1, a face part of a user is imaged by a camera, movement of a mouth of the user is detected from image data obtained by the camera, a signal level of a transmission voice signal to be transmitted from the user to a call partner is adjusted by adjusting an amplification factor, the amplification factor is set to a value smaller than 1 in a case where the movement of the mouth is not detected, and the amplification factor of the transmission voice signal is set to a value equal to or greater than 1 in a case where the movement of the mouth is detected.

However, in the above-described conventional technique, an acoustic echo is liable to be uncapable of being suppressed, and further improvement is required.

Patent Literature 1: JP 2014-110554 A

SUMMARY OF THE INVENTION

The present disclosure has been made to solve the above problem, and an object thereof is to provide a technique capable of reliably suppressing an acoustic echo.

A voice signal processing device according to the present disclosure includes an image acquisition part that acquires an image captured by a camera, a talker detection part that detects a near-end talker included in the image, a talker direction specification part that specifies a direction in which the detected near-end talker is located, a voice acquisition part that acquires a voice signal collected by a microphone array including a plurality of microphones, a voice arrival direction detection part that detects a voice arrival direction based on the voice signal, an utterance estimation part that estimates whether the near-end talker is uttering, based on the direction in which the near-end talker is located and the voice arrival direction, a level adjustment part that sets an amplification factor of the voice signal to a value equal to or greater than 1 in a case where the near-end talker is estimated to be uttering, sets the amplification factor of the voice signal to a value smaller than 1 in a case where the near-end talker is estimated not to be uttering, and adjusts a level of the voice signal based on the set amplification factor, and an output part that outputs the adjusted voice signal as a transmission signal to be transmitted to a far-end talker.

According to the present disclosure, an acoustic echo can be reliably suppressed.

BRIEF DESCRIPTION OF THE DRAWINGS

FIG. 9 is a first flowchart for describing an operation of a voice signal processing device in the third embodiment of the present disclosure.

DETAILED DESCRIPTION

Knowledge Underlying Present Disclosure

Figure 1:
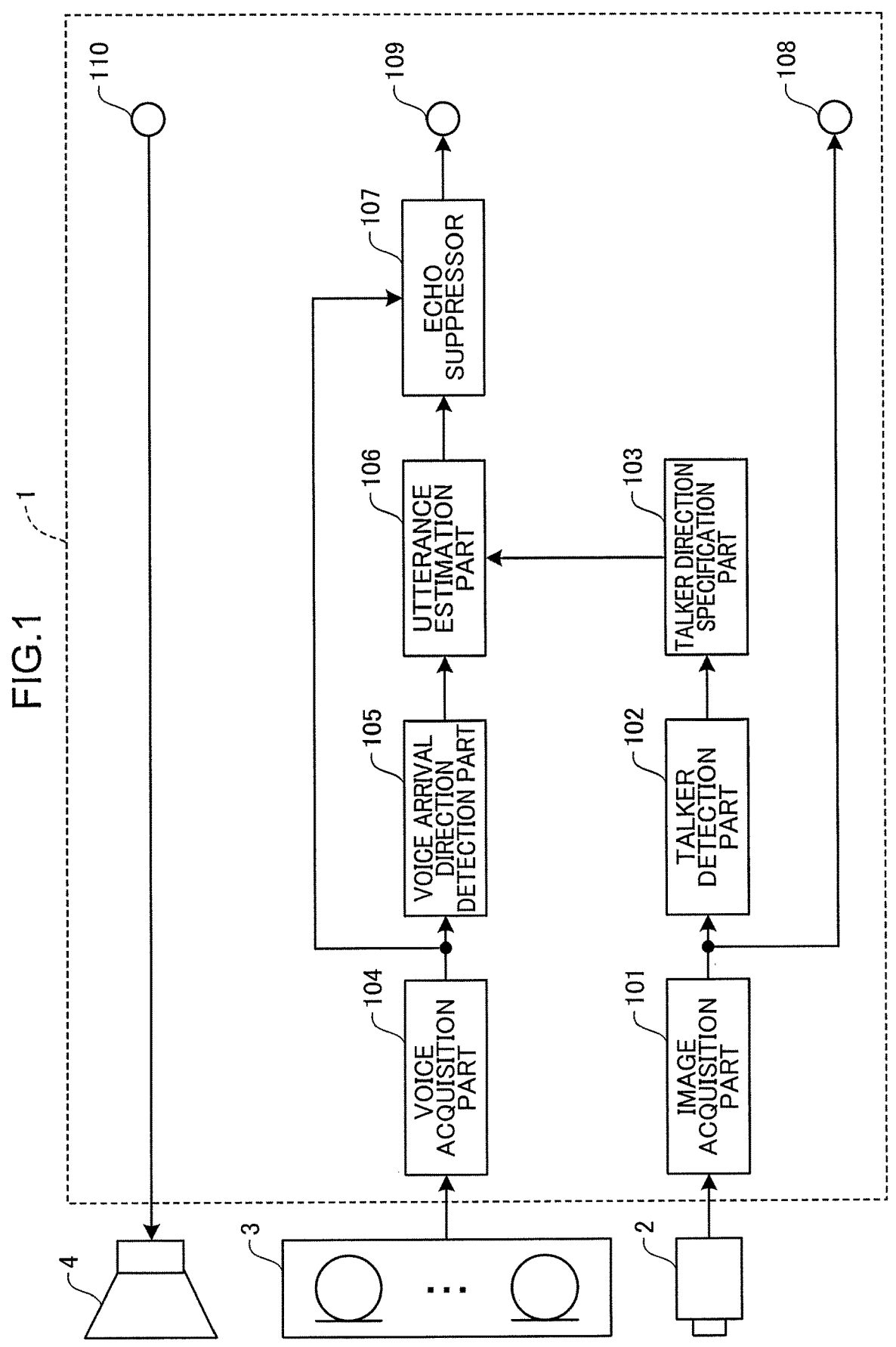
FIG. 1 is a diagram illustrating a configuration of a call device in a first embodiment of the present disclosure.

With the above-described conventional technique, a movement of a mouth of a user (near-end talker) is detected, but in a case where the mouth of the user is moving but the user is not uttering, or in a case where an erroneous detection is made that the mouth of the uttering user is not moving, a conventional hands-free call device may not normally operate.

Therefore, in the related art, a determination may not be accurately made whether the user (near-end talker) is uttering, and an acoustic echo is liable to be incapable of being suppressed.

To solve the above problems, the following techniques are disclosed.

(1) A voice signal processing device according to one aspect of the present disclosure includes an image acquisition part that acquires an image captured by a camera, a talker detection part that detects a near-end talker included in the image, a talker direction specification part that specifies a direction in which the detected near-end talker is located, a voice acquisition part that acquires a voice signal collected by a microphone array including a plurality of microphones, a voice arrival direction detection part that detects a voice arrival direction based on the voice signal, an utterance estimation part that estimates whether the near-end talker is uttering, based on the direction in which the near-end talker is located and the voice arrival direction, a level adjustment part that sets an amplification factor of the voice signal to a value equal to or greater than 1 in a case where the near-end talker is estimated to be uttering, sets the amplification factor of the voice signal to a value smaller than 1 in a case where the near-end talker is estimated not to be uttering, and adjusts a level of the voice signal based on the set amplification factor, and an output part that outputs the adjusted voice signal as a transmission signal to be transmitted to a far-end talker.

According to this configuration, an estimation is made whether the near-end talker is uttering, based on a direction in which the near-end talker is located, the direction being specified based on the image captured by the camera, and a voice arrival direction detected based on the voice signal collected by the microphone array. Then, in a case where the near-end talker is estimated to be uttering, the amplification factor of the voice signal is set to a value equal to or greater than 1, and in a case where the near-end talker is estimated not to be uttering, the amplification factor of the voice signal is set to a value smaller than 1, and the level of the voice signal is adjusted based on the set amplification factor. The adjusted voice signal is output as a transmission signal to be transmitted to the far-end talker.

Therefore, the estimation can be made whether the near-end talker is uttering with higher accuracy, based on the direction in which the near-end talker is located and the voice arrival direction. Then, in a case where the near-end talker is estimated to be uttering, the voice signal is transmitted as a transmission signal, and the voice of the near-end talker can be transmitted to the far-end talker side. Further, in a case where the near-end talker is not uttering, the level of the voice signal is reduced, and thus, even if a voice signal including an acoustic echo is input to the microphone array, the acoustic echo can be reliably suppressed.

(2) In the voice signal processing device according to (1), the utterance estimation part may determine whether the direction in which the near-end talker is located matches the voice arrival direction, estimate that the near-end talker is uttering in a case where the direction in which the near-end talker is located matches the voice arrival direction, and estimate that the near-end talker is not uttering in a case where the direction in which the near-end talker is located does not match the voice arrival direction.

According to this configuration, the near-end talker can be estimated to be uttering in the case where the direction in which the near-end talker is located matches the voice arrival direction, and the near-end talker can be made not to be uttering in the case where the direction in which the near-end talker is located does not match the voice arrival direction. Therefore, the estimation can be made whether the near-end talker is uttering with higher accuracy.

(3) In the voice signal processing device according to (2), the utterance estimation part may determine whether a direction in which a speaker that outputs a reception signal from the far-end talker is located matches the voice arrival direction in a case where the direction in which the near-end talker is located does not match the voice arrival direction, and may estimate that the near-end talker is not uttering in a case where the direction in which the speaker is located matches the voice arrival direction.

According to this configuration, in a case where a voice does not arrive from the direction in which the near-end talker is located and a voice arrives from the direction in which the speaker is located, the near-end talker can be estimated not to be uttering, and an acoustic echo output from the speaker can be reliably suppressed.

(4) The voice signal processing device according to (3) may further include a beamformer that suppresses a sound from a specific direction, wherein the utterance estimation part may estimate that the voice is a noise in the case where the direction in which the speaker is located does not match the voice arrival direction, and the beamformer may suppress the voice from the arrival direction in a case where the voice is estimated to be a noise.

According to this configuration, in a case where a voice does not arrive from the direction in which the near-end talker is located and a voice does not arrive from the direction in which the speaker is located, the voice can be estimated as a noise arriving from a noise source, and the beamformer can suppress the noise included in the voice signal.

(5) The voice signal processing device according to (3) may further include a beamformer that emphasizes a sound from a specific direction, wherein the beamformer may emphasize the voice from the arrival direction in the case where the near-end talker is estimated to be uttering.

According to this configuration, the beamformer can emphasize the voice of the near-end talker included in the voice signal.

(6) The voice signal processing device according to any one of (1) to (5) may further include an echo canceller that generates, using a reception signal output to the speaker, a pseudo echo signal indicating a component of the reception signal included in the voice signal, and cancels an acoustic echo component of the voice signal using the generated pseudo echo signal, wherein the level adjustment part may adjust a level of the voice signal in which the acoustic echo component has been canceled by the echo canceller, based on the set amplification factor.

According to this configuration, the echo canceller generates the pseudo echo signal indicating the component of the reception signal included in the voice signal using the reception signal output to the speaker, and cancels an acoustic echo component of the voice signal using the generated pseudo echo signal. Then, based on the set amplification factor, the level of the voice signal in which the acoustic echo component has canceled by the echo canceller is adjusted. Therefore, the acoustic echo component of the voice signal can be canceled by the echo canceller, and the acoustic echo can be suppressed more reliably.

(7) The voice signal processing device according to (6) further includes an imaging status determination part that determines whether an imaging status of the camera is good, a double-talk determination part that determines whether double talk has occurred, based on the voice signal in which the acoustic echo component has been canceled by the echo canceller, and a selection part that selects an estimation result by the utterance estimation part as to whether the near-end talker is uttering in a case where the imaging status is determined to be good, and selects a determination result by the double-talk determination part as to whether double talk has occurred in a case where the imaging status is determined not to be good, wherein the level adjustment part may set the amplification factor of the voice signal to a value equal to or greater than 1, in a case where the estimation result by the utterance estimation part is selected and the near-end talker is estimated to be uttering or in a case where the determination result by the double-talk determination part is selected and the double talk is determined to have occurred, and may set the amplification factor of the voice signal to a value smaller than 1, in a case where the estimation result by the utterance estimation part is selected and the near-end talker is estimated not to be uttering or in a case where the determination result by the double-talk determination part is selected and the double talk is determined not to have occurred.

If the imaging status of the camera is good, the accuracy of detecting the near-end talker from the image is high, and if the imaging status of the camera is not good, the accuracy of detecting the near-end talker from the image is low. Therefore, if the imaging status of the camera is good, the amplification factor of the voice signal is set based on the estimation result using an image by the utterance estimation part as to whether the near-end talker is uttering, and if the imaging status of the camera is not good, the amplification factor of the voice signal is set based on the determination result without using an image by the double-talk determination part as to whether the double talk has occurred. Therefore, the acoustic echo can be suppressed regardless of whether the imaging status of the camera is good.

(8) In the voice signal processing device according to any one of (1) to (7), the talker detection part may detect the near-end talker included in the image and detect a movement of a mouth of the near-end talker, and the talker direction specification part may specify a direction in which the near-end talker whose movement of the mouth has been detected is located.

According to this configuration, the estimation can be made whether the near-end talker is uttering with higher accuracy by detecting not only the near-end talker but also the movement of the mouth of the near-end talker.

Further, the present disclosure can be implemented not only as the voice signal processing device having the characteristic configuration as described above but also as a voice signal processing method for executing characteristic processing corresponding to the characteristic configuration of the voice signal processing device. Further, the present disclosure can also be implemented as a computer program that causes a computer to execute characteristic processing included in the voice signal processing method. Therefore, also in another aspect described below, the same effect as that of the above-described voice signal processing device can be obtained.

(9) A voice signal processing method according to another aspect of the present disclosure includes: by a computer, acquiring an image captured by a camera, detecting a near-end talker included in the image, specifying a direction in which the detected near-end talker is located, acquiring a voice signal collected by a microphone array including a plurality of microphones, detecting a voice arrival direction based on the voice signal, estimating whether the near-end talker is uttering, based on the direction in which the near-end talker is located and the voice arrival direction, setting an amplification factor of the voice signal to a value equal to or greater than 1 in a case where the near-end talker is estimated to be uttering, and setting the amplification factor of the voice signal to a value smaller than 1 in a case where the near-end talker is estimated not to be uttering, and adjusting a level of the voice signal based on the set amplification factor, and outputting the adjusted voice signal as a transmission signal to be transmitted to a far-end talker.

(10) A voice signal processing program according to another aspect of the present disclosure causes a computer to function as: an image acquisition part that acquires an image captured by a camera, a talker detection part that detects a near-end talker included in the image, a talker direction specification part that specifies a direction in which the detected near-end talker is located, a voice acquisition part that acquires a voice signal collected by a microphone array including a plurality of microphones, a voice arrival direction detection part that detects a voice arrival direction based on the voice signal, an utterance estimation part that estimates whether the near-end talker is uttering, based on the direction in which the near-end talker is located and the voice arrival direction, a level adjustment part that sets an amplification factor of the voice signal to a value equal to or greater than 1 in a case where the near-end talker is estimated to be uttering, sets the amplification factor of the voice signal to a value smaller than 1 in a case where the near-end talker is estimated not to be uttering, and adjusts a level of the voice signal based on the set amplification factor, and an output part that outputs the adjusted voice signal as a transmission signal to be transmitted to a far-end talker.

(11) A non-transitory computer readable recording medium according to another aspect of the present disclosure stores a voice signal processing program, the voice signal processing program causing a computer to function as: an image acquisition part that acquires an image captured by a camera, a talker detection part that detects a near-end talker included in the image, a talker direction specification part that specifies a direction in which the detected near-end talker is located, a voice acquisition part that acquires a voice signal collected by a microphone array including a plurality of microphones, a voice arrival direction detection part that detects a voice arrival direction based on the voice signal, an utterance estimation part that estimates whether the near-end talker is uttering, based on the direction in which the near-end talker is located and the voice arrival direction, a level adjustment part that sets an amplification factor of the voice signal to a value equal to or greater than 1 in a case where the near-end talker is estimated to be uttering, sets the amplification factor of the voice signal to a value smaller than 1 in a case where the near-end talker is estimated not to be uttering, and adjusts a level of the voice signal based on the set amplification factor, and an output part that outputs the adjusted voice signal as a transmission signal to be transmitted to a far-end talker.

Embodiments of the present disclosure will be described below with reference to the accompanying drawings. Note that the embodiments below are examples embodying the present disclosure, and are not intended to limit the technical scope of the present disclosure.

First Embodiment

FIG. 1 is a diagram illustrating a configuration of a call device in the first embodiment of the present disclosure. The call device is for use in an amplifying hands-free call system mounted on an automobile or the like, an amplifying two-way communication conference system, an interphone system, and the like.

The call device illustrated in FIG. 1 includes a voice signal processing device 1, a camera 2, a microphone array 3, and a speaker 4.

The camera 2 is disposed in a space where a near-end talker is located, and captures an image of the inside of the space. The camera 2 outputs a captured image to the voice signal processing device 1. The camera 2 may be, for example, an all-around camera capable of capturing an image at 360 degrees. Note that the near-end talker represents a person in the space on and transmission side, and a far-end talker represents a person in the space on a reception side.

The microphone array 3 includes a plurality of microphones that converts an acoustic signal into an electric signal. The microphone array 3 is disposed in the space where the near-end talker is located, and collects a voice of the near-end talker. The microphone array 3 outputs a voice signal indicating a voice collected by each of the plurality of microphones to the voice signal processing device 1.

The voice signal processing device 1 includes an image acquisition part 101, a talker detection part 102, a talker direction specification part 103, a voice acquisition part 104, a voice arrival direction detection part 105, an utterance estimation part 106, an echo suppressor 107, an image output part 108, a voice output part 109, and a voice input part 110.

The image acquisition part 101 acquires an image captured by the camera 2.

The talker detection part 102 detects the near-end talker included in the image acquired by the image acquisition part 101. The talker detection part 102 detects a face of the near-end talker from the image acquired by the image acquisition part 101. Note that the talker detection part 102 may detect the near-end talker with person detection that detects an entire body or an upper body instead of detecting the face.

The talker direction specification part 103 specifies a direction in which the near-end talker detected by the talker detection part 102 is located.

Here, a method for specifying the direction in which the near-end talker is located with the talker direction specification part 103 will be described.

Figure 2:
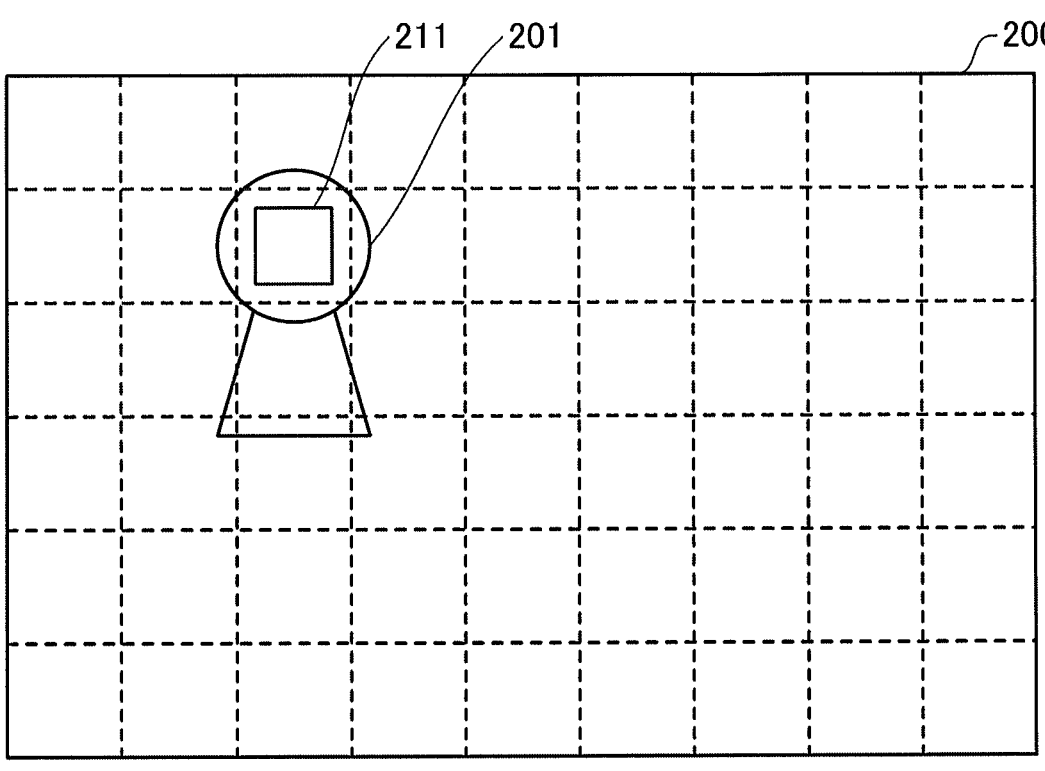
FIG. 2 is a schematic diagram for describing a method for specifying a direction in which a near-end talker is located in the first embodiment.

FIG. 2 is a schematic diagram for describing the method for specifying the direction in which the near-end talker is located in the first embodiment.

An image 200 captured by the camera 2 is divided into a lattice shape. A direction from the position of the camera 2 is assigned to each divided area. The direction from the position of the camera 2 is represented by a horizontal angle $\theta$ and a vertical angle $\varphi$. The talker direction specification part 103 specifies an area including a face 211 of a near-end talker 201 detected by the talker detection part 102 from a plurality of areas in the image, and specifies the horizontal angle $\theta$ and the vertical angle $\varphi$ assigned to the specified area as the direction in which the near-end talker is located.

Note that, in the first embodiment, the image 200 is divided into a lattice shape, but the present disclosure is not particularly limited thereto, and the image 200 may be divided into a plurality of rectangular areas with a uniform width arranged in the horizontal direction. In this case, the direction from the position of the camera 2 is represented only by the horizontal angle $\theta$.

In addition, the camera 2 may be regarded as being at the same position as the position of the microphone array 3, and the talker direction specification part 103 may specify the direction in which the near-end talker is located based on the position of the microphone array 3. The horizontal angle $\theta$ and the vertical angle $\varphi$ assigned to each of the plurality of areas in the image 200 are set based on the position of the microphone array 3. Note that the talker direction specification part 103 may specify the direction in which the near-end talker is located based on the position of the camera 2, and correct the direction in which the near-end talker is located, based on a positional relationship between the camera 2 and the microphone array 3.

The voice acquisition part 104 acquires a voice signal collected by the microphone array 3 including the plurality of microphones. The voice acquisition part 104 outputs the voice signal acquired from the microphone array 3 to the voice arrival direction detection part 105 and the echo suppressor 107.

The voice arrival direction detection part 105 detects a voice arrival direction based on the voice signal acquired by the voice acquisition part 104. The voice arrival direction detection part 105 estimates a time difference in arrival with a cross-correlation method using a cross-correlation function among a plurality of voice signals or a whitening cross-correlation method using a whitening cross-correlation function, and detects a voice arrival direction based on the estimated time difference in arrival and an interval between microphones. The voice arrival direction to the microphone array 3 is represented by the horizontal angle $\theta$ and the vertical angle $\varphi$.

For example, in a case where the microphone array 3 includes the plurality of microphones disposed in the horizontal direction and the vertical direction, the voice arrival direction is represented by the horizontal angle $\theta$ and the vertical angle $\varphi$. Note that in a case where the microphone array 3 includes the plurality of microphones disposed only in the horizontal direction, the voice arrival direction is represented only by the horizontal angle $\theta$.

Note that the voice arrival direction detection part 105 may detect the voice arrival direction with a beamforming method, a subspace method, or the like.

The utterance estimation part 106 estimates whether the near-end talker is uttering, based on the direction in which the near-end talker is located, the direction being specified by the talker direction specification part 103, and the voice arrival direction detected by the voice arrival direction detection part 105. The utterance estimation part 106 determines whether the direction in which the near-end talker is located matches the voice arrival direction. In a case where the direction in which the near-end talker is located matches the voice arrival direction, the utterance estimation part 106 estimates that the near-end talker is uttering. On the other hand, in a case where the direction in which the near-end talker is located does not match the voice arrival direction, the utterance estimation part 106 estimates that the near-end talker is not uttering.

Figure 3:
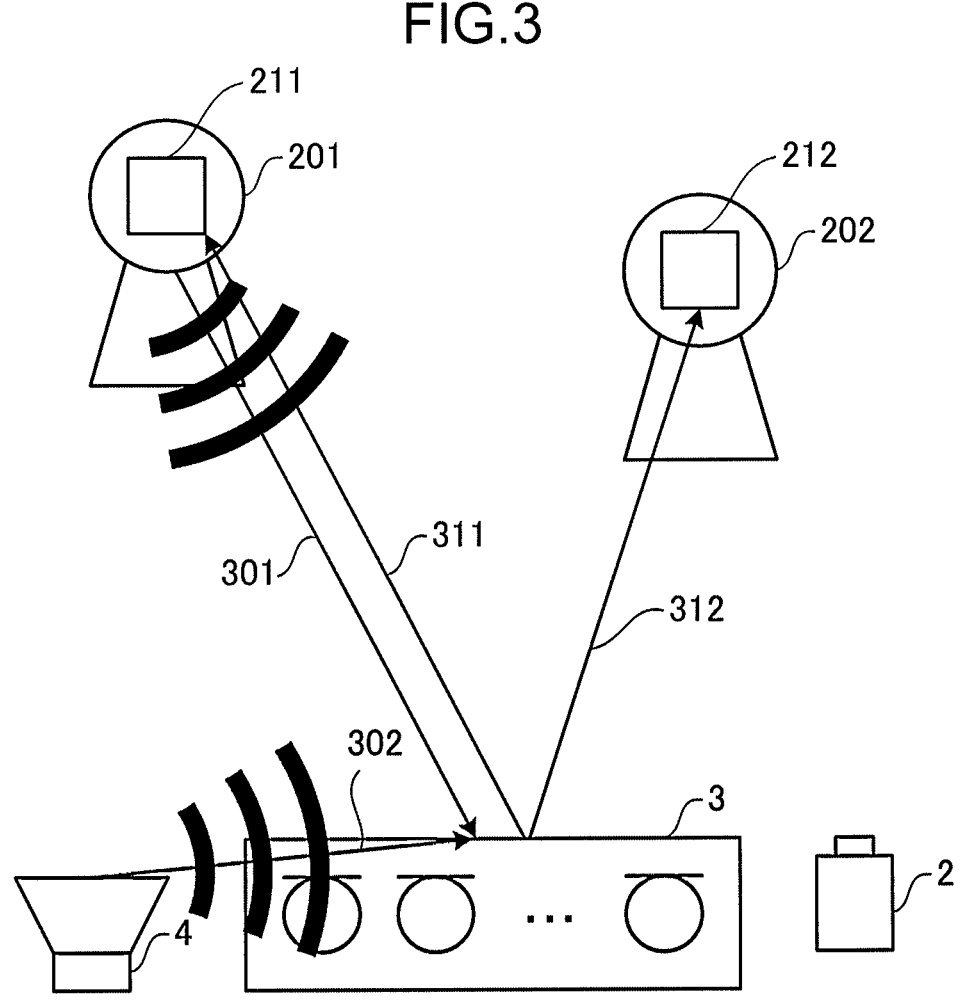
FIG. 3 is a schematic diagram for describing a method for estimating whether the near-end talker is uttering in the first embodiment.

FIG. 3 is a schematic diagram for describing a method for estimating whether the near-end talker is uttering in the first embodiment.

As illustrated in FIG. 3, the utterance estimation part 106 determines whether the direction 311 where the near-end talker 201 is located matches a voice arrival direction 301. More specifically, the utterance estimation part 106 determines whether the horizontal angle $\theta$ and the vertical angle $\varphi$ indicating the direction 311 where the face 211 of the near-end talker 201 has been detected match the horizontal angle $\theta$ and the vertical angle $\varphi$ indicating the voice arrival direction 301. In a case where the near-end talker 201 is uttering, the horizontal angle $\theta$ and the vertical angle $\varphi$ indicating the direction 311 where the face 211 of the near-end talker 201 has been detected match the horizontal angle $\theta$ and the vertical angle $\varphi$ indicating the voice arrival direction 301. Further, in a case where the near-end talker is not uttering and a voice is output from the speaker 4, the horizontal angle $\theta$ and the vertical angle $\varphi$ indicating the direction 311 where the face 211 of the near-end talker 201 has been detected do not match the horizontal angle $\theta$ and the vertical angle $\varphi$ indicating the voice arrival direction 302.

In a case where a plurality of near-end talkers 201 and 202 are present, the talker detection part 102 detects faces 211 and 212 of the plurality of near-end talkers 201 and 202 from the image acquired by the image acquisition part 101. The talker direction specification part 103 then specifies directions 311 and 312 where the plurality of near-end talkers 201 and 202 detected by the talker detection part 102 is located. In a case where the near-end talker 201 is uttering and the near-end talker 202 is not uttering, the horizontal angle θ and the vertical angle φ indicating the direction 311 where the face 211 of the near-end talker 201 has been detected match the horizontal angle θ and the vertical angle φ indicating the voice arrival direction 301, but the horizontal angle θ and the vertical angle φ indicating the direction 312 where the face 212 of the near-end talker 202 has been detected do not match the horizontal angle θ and the vertical angle φ indicating the voice arrival direction 301.

Note that the utterance estimation part 106 may estimate that the near-end talker is uttering not only in a case where the direction in which the near-end talker is located completely matches the voice arrival direction, but also in a case where the difference between the direction in which the near-end talker is located and the voice arrival direction is equal to or smaller than a predetermined angle (for example, 5 degrees).

The echo suppressor 107 sets an amplification factor of the voice signal to a value equal to or greater than 1 in a case where the utterance estimation part 106 estimates that the near-end talker is uttering, sets the amplification factor of the voice signal to a value smaller than 1 in a case where the utterance estimation part 106 estimates that the near-end talker is not uttering, and adjusts the level of the voice signal based on the set amplification factor. The echo suppressor 107 is an example of a level adjustment part.

More specifically, the echo suppressor 107 sets the amplification factor of the voice signal to 1 in a case where the utterance estimation part 106 estimates that the near-end talker is uttering, sets the amplification factor of the voice signal to 0 in a case where the utterance estimation part 106 estimates that the near-end talker is not uttering, and adjust the level of the voice signal based on the set amplification factor. That is, in the case where the near-end talker is uttering, the echo suppressor 107 outputs the voice signal acquired by the voice acquisition part 104 as it is. On the other hand, in the case where the near-end talker is not uttering, the echo suppressor 107 does not output the voice signal acquired by the voice acquisition part 104.

Note that in the case where the utterance estimation part 106 estimates that the near-end talker is not uttering, the echo suppressor 107 may set the amplification factor of the voice signal to a value smaller than 1 and greater than 0. For example, in the case where the utterance estimation part 106 estimates that the near-end talker is not uttering, the echo suppressor 107 may set the amplification factor of the voice signal to 0.5. As a result, even in a case where the voice of the near-end talker is erroneously determined to be the voice of the far-end talker (the voice from the speaker 4), the voice signal of the near-end talker can be transmitted as a transmission signal although the output level is reduced.

The image output part 108 outputs the image acquired by the image acquisition part 101.

The voice output part 109 outputs the voice signal whose level has been adjusted by the echo suppressor 107 as a transmission signal to be transmitted to the far-end talker.

The voice input part 110 acquires a reception signal received from a call device (not illustrated) on the reception side, and outputs the reception signal to the speaker 4.

The speaker 4 outputs the input reception signal to the outside. Here, in a case where a voice output from the speaker 4 is collected by the microphone array 3, a voice uttered by the far-end talker on the reception side is reproduced from a speaker on the reception side with a delay, and a so-called acoustic echo is generated.

Note that the image output part 108, the voice output part 109, and the voice input part 110 are connected to a communication part (not illustrated). The communication part transmits the transmission signal and the image to the call device (not illustrated) on the reception side via a network, and receives the reception signal from the call device (not illustrated) on the reception side via the network. The network is the Internet, for example.

Furthermore, the call device may include a display that displays an image received from the call device (not illustrated) on the reception side. In this case, the voice signal processing device 1 may further include an image input part that acquires an image received from the call device (not illustrated) on the reception side and outputs the acquired image to the display.

Further, the voice signal processing device 1, the camera 2, the microphone array 3, and the speaker 4 may be provided in one housing. The voice signal processing device 1, the camera 2, the microphone array 3, and the speaker 4 may be provided respectively in individual housings. The voice signal processing device 1 and at least one of the camera 2, the microphone array 3, and the speaker 4 may be provided in one housing. Further, the display may include the speaker 4.

Further, the image acquired by the camera 2 may not be transmitted to the call device (not illustrated) on the reception side. In this case, the voice signal processing device 1 may not include the image output part 108.

Next, an operation of the voice signal processing device 1 according to the first embodiment of the present disclosure will be described.

Figure 4:
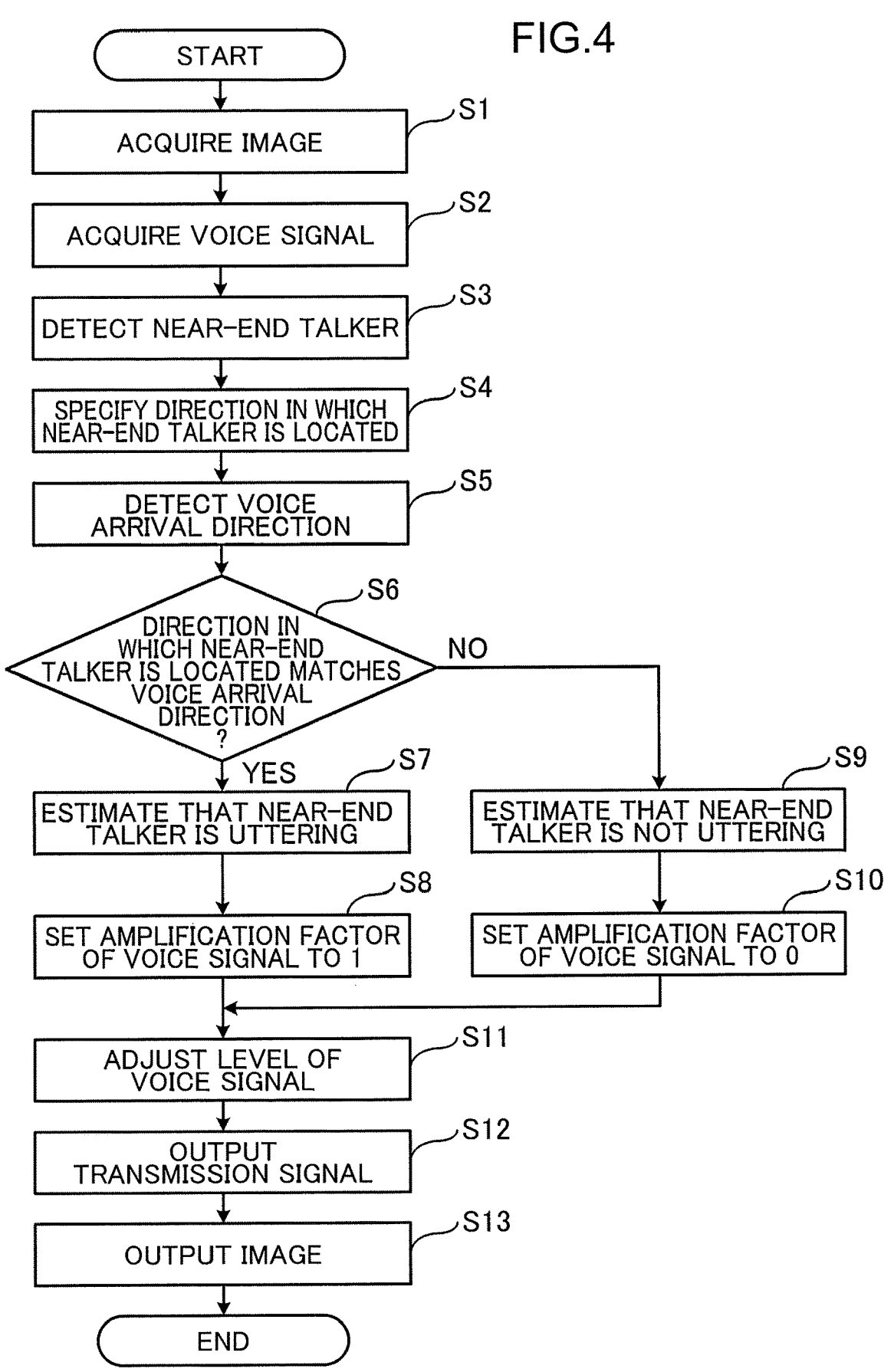
FIG. 4 is a flowchart for describing an operation of a voice signal processing device in the first embodiment of the present disclosure.

FIG. 4 is a flowchart for describing the operation of the voice signal processing device 1 in the first embodiment of the present disclosure.

First, in step S1, the image acquisition part 101 acquires an image captured by the camera 2.

Next, in step S2, the voice acquisition part 104 acquires a voice signal collected by the microphone array 3.

Next, in step S3, the talker detection part 102 detects the near-end talker included in the image acquired by the image acquisition part 101. At this time, the talker detection part 102 detects a face of the near-end talker from the image acquired by the image acquisition part 101. Note that in a case where a plurality of near-end talkers is located in a space, the talker detection part 102 detects the face of each of the plurality of near-end talkers. Further, the talker detection part 102 may detect the near-end talker with person detection instead of face detection.

Next, in step S4, the talker direction specification part 103 specifies a direction in which the near-end talker detected by the talker detection part 102 is located. At this time, the talker direction specification part 103 specifies an area including a face of a near-end talker detected by the talker detection part 102 from a plurality of areas in the image, and specifies the horizontal angle θ and the vertical angle φ assigned to the specified area as the direction in which the near-end talker is located. Note that in a case where the plurality of near-end talkers is located in the space, the talker direction specification part 103 specifies directions where the plurality of near-end talkers is located.

Next, in step S5, the voice arrival direction detection part 105 detects a voice arrival direction based on the voice signal acquired by the voice acquisition part 104. At this time, the voice arrival direction detection part 105 estimates the position of a sound source using the voice signals from the plurality of microphones, and detects the estimated position of the sound source as the voice arrival direction. The voice arrival direction is represented by the horizontal angle θ and the vertical angle φ. Note that, in a case where a plurality of sound sources is located in the space, the voice arrival direction detection part 105 detects the arrival direction of a voice from each of the plurality of sound sources.

Next, in step S6, the utterance estimation part 106 determines whether the direction in which the near-end talker is located, the direction being specified by the talker direction specification part 103, matches the voice arrival direction detected by the voice arrival direction detection part 105.

Here, in a case where the direction in which the near-end talker is located is determined to match the voice arrival direction (YES in step S6), in step S7, the utterance estimation part 106 estimates that the near-end talker is uttering.

Next, in step S8, the echo suppressor 107 sets the amplification factor of the voice signal to 1.

On the other hand, in a case where the direction in which the near-end talker is located is determined not to match the voice arrival direction (NO in step S6), in step S9 the utterance estimation part 106 estimates that the near-end talker is not uttering.

Next, in step S10, the echo suppressor 107 sets the amplification factor of the voice signal to 0.

In step S11, the echo suppressor 107 adjusts the level of the voice signal based on the set amplification factor. In a case where the amplification factor is set to 1, the echo suppressor 107 adjusts the level of the voice signal to 1 time. In a case where the amplification factor is set to 0, the echo suppressor 107 adjusts the level of the voice signal to 0.

Next, in step S12, the voice output part 109 outputs the voice signal whose level has been adjusted by the echo suppressor 107 as a transmission signal to be transmitted to the far-end talker.

Next, in step S13, the image output part 108 outputs an image captured by the image acquisition part 101. Note that the image output process by the image output part 108 in step S13 may be omitted.

In such a manner, the estimation is made whether the near-end talker is uttering, based on the direction in which the near-end talker is located, the direction being specified based on the image captured by the camera 2, and the voice arrival direction detected based on the voice signal collected by the microphone array 3. Then, in a case where the near-end talker is estimated to be uttering, the amplification factor of the voice signal is set to a value equal to or greater than 1, and in a case where the near-end talker is estimated not to be uttering, the amplification factor of the voice signal is set to a value smaller than 1, and the level of the voice signal is adjusted based on the set amplification factor. The adjusted voice signal is output as a transmission signal to be transmitted to the far-end talker.

Therefore, the estimation can be made whether the near-end talker is uttering with higher accuracy, based on the direction in which the near-end talker is located and the voice arrival direction. Then, in a case where the near-end talker is estimated to be uttering, the voice signal is transmitted as a transmission signal, and the voice of the near-end talker can be transmitted to the far-end talker side. Further, in the case where the near-end talker is not uttering, the level of the voice signal is reduced, and thus, even if a voice signal including an acoustic echo is input to the microphone array 3, the acoustic echo can be reliably suppressed.

Further, in the first embodiment, since the utterance status of a person is estimated based on the position of the person obtained by the camera 2 and the sound source direction obtained by the microphone array 3, the utterance status can be estimated more reliably than in the conventional technique of estimating the utterance status of the person only based on a movement of a mouth from the image of the camera. Further, since the presence or absence of utterance of each talker can be estimated even in a status where a plurality of near-end talkers is uttering, double talk can be determined with high accuracy, and acoustic echoes can be suppressed with high accuracy.

Second Embodiment

In the first embodiment described above, the determination is made whether the direction in which the talker is located matches the voice arrival direction. In the case where the direction in which the talker is located matches the voice arrival direction, the near-end talker is estimated to be uttering, and in the case where the direction in which the talker is located does not match the voice arrival direction, the near-end talker is estimated not to be uttering. Conversely, in the second embodiment, in a case where a direction in which a talker is located does not match a voice arrival direction, a determination is made whether a direction in which a speaker is located matches the voice arrival direction. Then, in a case where the direction in which the speaker is located matches the voice arrival direction, the near-end talker is estimated not to be uttering.

Figure 5:
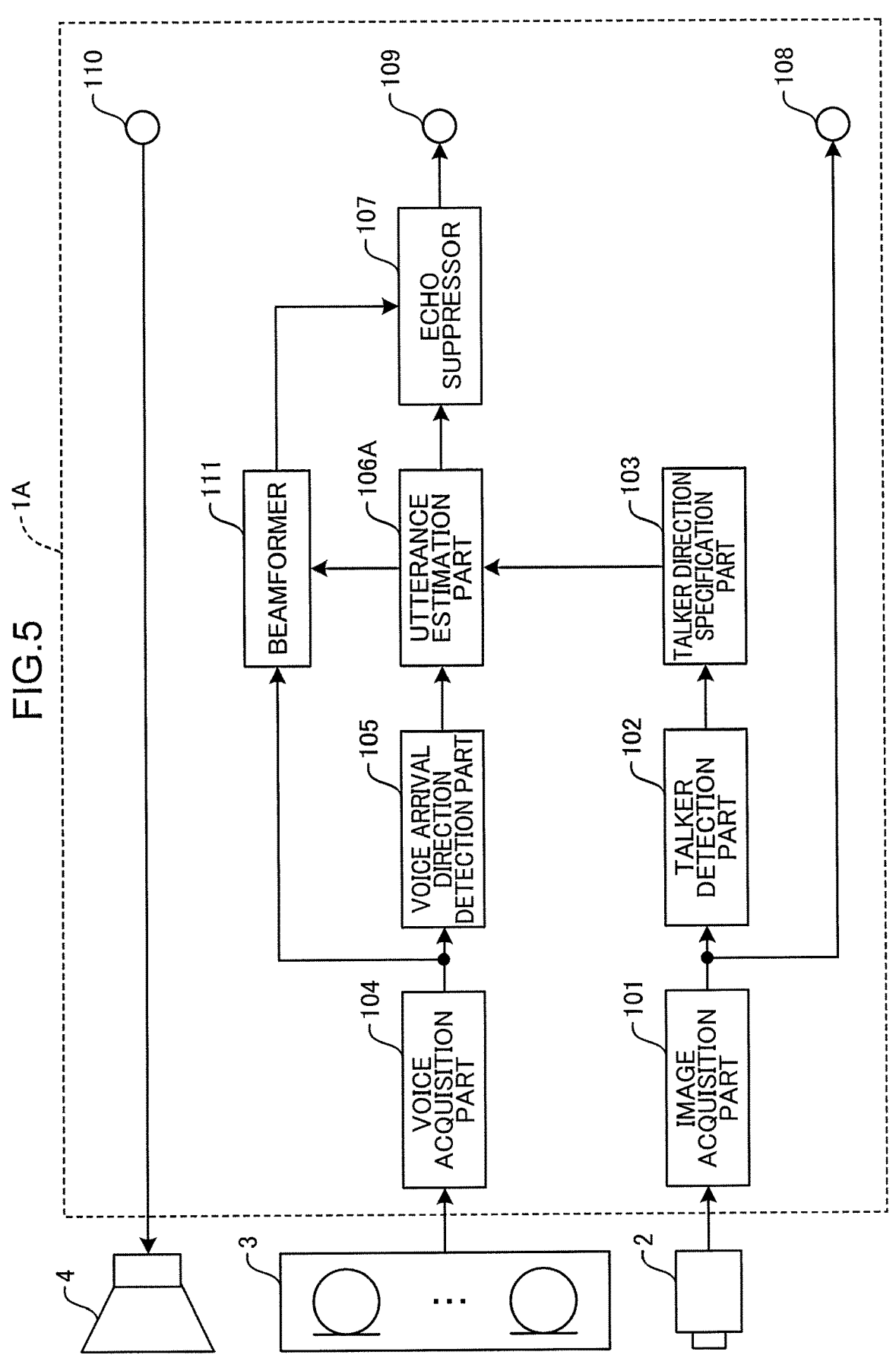
FIG. 5 is a diagram illustrating a configuration of a call device in a second embodiment of the present disclosure.

FIG. 5 is a diagram illustrating a configuration of a call device in the second embodiment of the present disclosure.

The call device illustrated in FIG. 5 includes a voice signal processing device 1A, a camera 2, a microphone array 3, and a speaker 4. In the second embodiment, the same components as those in the first embodiment will be denoted by the same reference signs as those in the first embodiment, and description thereof will be omitted.

The voice signal processing device 1A includes an image acquisition part 101, a talker detection part 102, a talker direction specification part 103, a voice acquisition part 104, a voice arrival direction detection part 105, an utterance estimation part 106A, an echo suppressor 107, an image output part 108, a voice output part 109, a voice input part 110, and a beamformer 111.

The voice acquisition part 104 outputs a voice signal acquired from the microphone array 3 to the voice arrival direction detection part 105 and the beamformer 111.

The utterance estimation part 106A determines whether the direction in which the near-end talker is located matches the voice arrival direction. In a case where the direction in which the near-end talker is located matches the voice arrival direction, the utterance estimation part 106A estimates that the near-end talker is uttering. Further, in a case where the direction in which the near-end talker is located does not match the voice arrival direction, the utterance estimation part 106A determines whether a direction in which the speaker 4 that outputs a reception signal from a far-end talker is located matches the voice arrival direction. In a case where the direction in which the speaker is located matches the voice arrival direction, the utterance estimation part 106A estimates that the near-end talker is not uttering. In a case where the direction in which the speaker is located does not match the voice arrival direction, the utterance estimation part 106A estimates that the voice is a noise.

Note that, in a case where the microphone array 3 and the speaker 4 are provided in one housing, the direction in which the speaker 4 is located with respect to the microphone array 3 is determined in advance. Therefore, a memory, not illustrated, included in the voice signal processing device 1A stores in advance the direction in which speaker 4 is located. The direction in which the speaker 4 is located is represented by a horizontal angle θ and a vertical angle φ.

Further, in a case where a display includes the speaker 4, the voice signal processing device 1A may detect the display from the image acquired by the image acquisition part 101 and specify the direction in which the display is located as the direction in which the speaker 4 is located.

The beamformer 111 suppresses a sound from a specific direction. In a case where the utterance estimation part 106A estimates that the voice is a noise, the beamformer 111 suppresses the voice from the arrival direction. The beamformer 111 forms directivity with a beamforming technique so as to let voice signals arriving from a direction in which a near-end talker is located and a direction in which the speaker is located pass, and attenuate voice signals arriving from other directions. The beamformer 111 outputs a voice signal to the echo suppressor 107.

Figure 6:
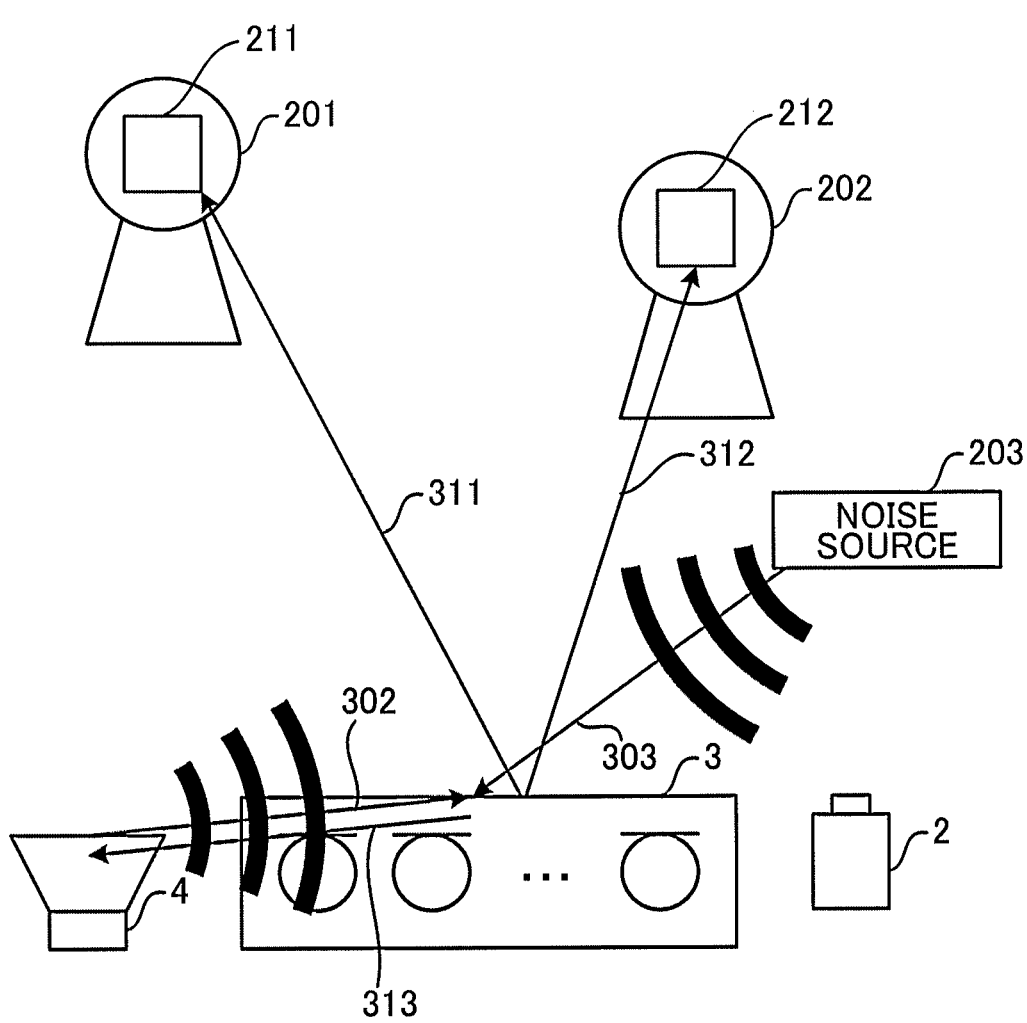
FIG. 6 is a schematic diagram for describing a method for estimating whether a near-end talker is uttering in the second embodiment.

FIG. 6 is a schematic diagram for describing a method for estimating whether the near-end talker is uttering in the second embodiment.

As illustrated in FIG. 6, the utterance estimation part 106A determines whether a direction 311 where a near-end talker 201 is located matches a voice arrival direction 302 or 303. More specifically, the utterance estimation part 106A determines whether the horizontal angle θ and the vertical angle φ indicating the direction 311 where a face 211 of the near-end talker 201 has been detected match the horizontal angle θ and the vertical angle φ indicating the voice arrival direction 302 or 303. In a case where the near-end talker is not uttering and a voice is output from the speaker 4 or a noise source 203, the horizontal angle θ and the vertical angle φ indicating the direction 311 where the face 211 of the near-end talker 201 has been detected do not match the horizontal angle θ and the vertical angle φ indicating the voice arrival direction 302 or 303.

In a case where the direction 311 where the near-end talker 201 is located does not match the voice arrival direction 302 or 303, the utterance estimation part 106A determines whether the direction 313 where the speaker 4 is located matches the voice arrival direction 302 or 303. More specifically, the utterance estimation part 106A determines whether the horizontal angle θ and the vertical angle φ indicating the direction 313 where the speaker 4 is located match the horizontal angle θ and the vertical angle φ indicating the voice arrival direction 302 or 303.

In a case where the direction 313 where the speaker 4 is located matches the voice arrival direction 302, the utterance estimation part 106A estimates that the near-end talker is not uttering. In this case, the echo suppressor 107 sets an amplification factor of the voice signal to a value smaller than 1, and adjusts the level of the voice signal based on the set amplification factor.

Further, in a case where the direction 313 where the speaker 4 is located does not match the voice arrival direction 303, that is, in a case where the voice arrives from the noise source 203, the utterance estimation part 106A estimates that the voice is a noise. In this case, the utterance estimation part 106A outputs the arrival direction 303 of the voice indicating a noise to the beamformer 111. The beamformer 111 forms directivity to attenuate a voice signal from the arrival direction 303 of the voice indicating a noise. As a result, a noise from the noise source 203 is removed. The beamformer 111 does not output the voice signal from the noise source 203, but outputs the voice signal from the near-end talker 201 and the voice signal from the speaker 4 to the echo suppressor 107.

Note that the beamformer 111 may emphasize a sound from a specific direction. In a case where an estimation is made that the direction in which the near-end talker is located matches the voice arrival direction and the near-end talker is uttering, the beamformer 111 may emphasize the voice from the arrival direction. The beamformer 111 may form directivity to emphasize a voice signal arriving from the direction in which the near-end talker is located with the beamforming technique.

Next, an operation of the voice signal processing device 1A in the second embodiment of the present disclosure will be described.

Figure 7:
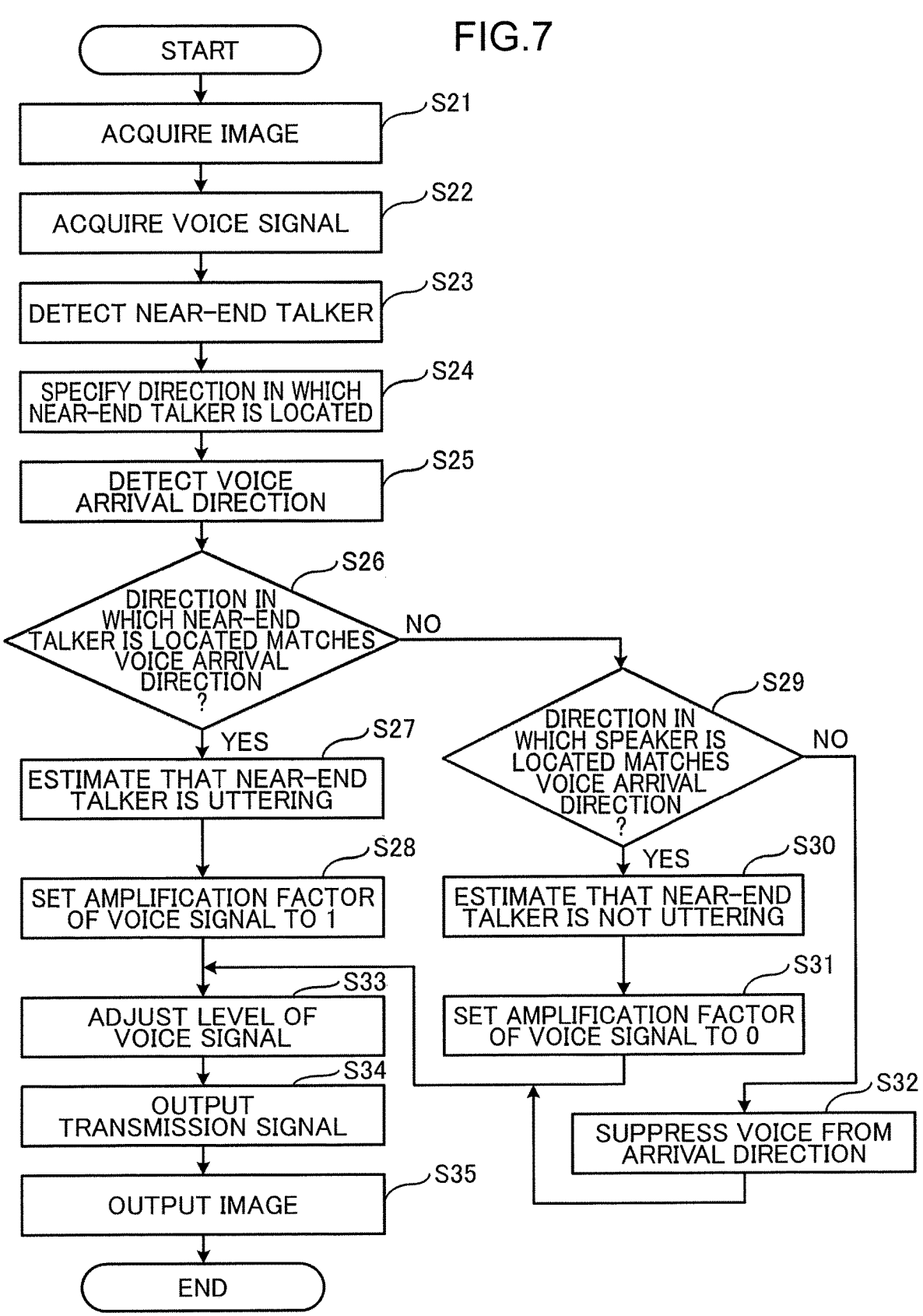
FIG. 7 is a flowchart for describing an operation of a voice signal processing device in the second embodiment of the present disclosure.

FIG. 7 is a flowchart for describing the operation of the voice signal processing device 1A in the second embodiment of the present disclosure.

Processing in steps S21 to S28 illustrated in FIG. 7 is the same as the processing in steps S1 to S8 illustrated in FIG. 4, and thus will not be described.

Note that, between steps S27 and S28, the beamformer 111 may emphasize a voice from the arrival direction.

In a case where the direction in which the near-end talker is located is determined not to match the voice arrival direction (NO in step S26), in step S29, the utterance estimation part 106A determines whether the direction in which the speaker 4 is located matches the voice arrival direction detected by the voice arrival direction detection part 105.

Here, in a case where the direction in which the speaker 4 is located is determined to match the voice arrival direction (YES in step S29), in step S30 the utterance estimation part 106A estimates that the near-end talker is not uttering.

Next, in step S31, the echo suppressor 107 sets the amplification factor of the voice signal to 0.

On the other hand, in a case where a determination is made that the direction in which the speaker 4 is located does not match the voice arrival direction (NO in step S29), in step S32, the beamformer 111 suppresses the voice from the arrival direction, that is, a noise from the noise source.

Note that, in a case where a plurality of noise sources is located in the space, the utterance estimation part 106A may output arrival directions of a plurality of voices respectively from the plurality of noise sources to the beamformer 111. The beamformer 111 may suppress the plurality of voices from the plurality of arrival directions, that is, the plurality of noises from the plurality of noise sources.

Next, in step S33, the echo suppressor 107 adjusts the level of the voice signal based on the set amplification factor.

Note that processing in steps S33 to S35 illustrated in FIG. 7 is the same as the processing in steps S11 to S13 illustrated in FIG. 4, and thus will not be described. Note that the image output process by the image output part 108 in step S35 may be omitted.

In such a manner, in a case where a voice does not arrive from the direction in which the near-end talker is located and a voice does not arrive from the direction in which the speaker 4 is located, the estimation can be made that the voice is a noise arriving from the noise source, and the beamformer 111 can suppress the noise included in the voice signal.

Third Embodiment

In the first embodiment, the voice signal acquired by the voice acquisition part 104 is output to the echo suppressor

107. On the contrary, in the third embodiment, a call device further includes an echo canceller that cancels an acoustic echo component of a voice signal, and a voice signal acquired by the voice acquisition part 104 is output to the echo canceller.

Figure 8:
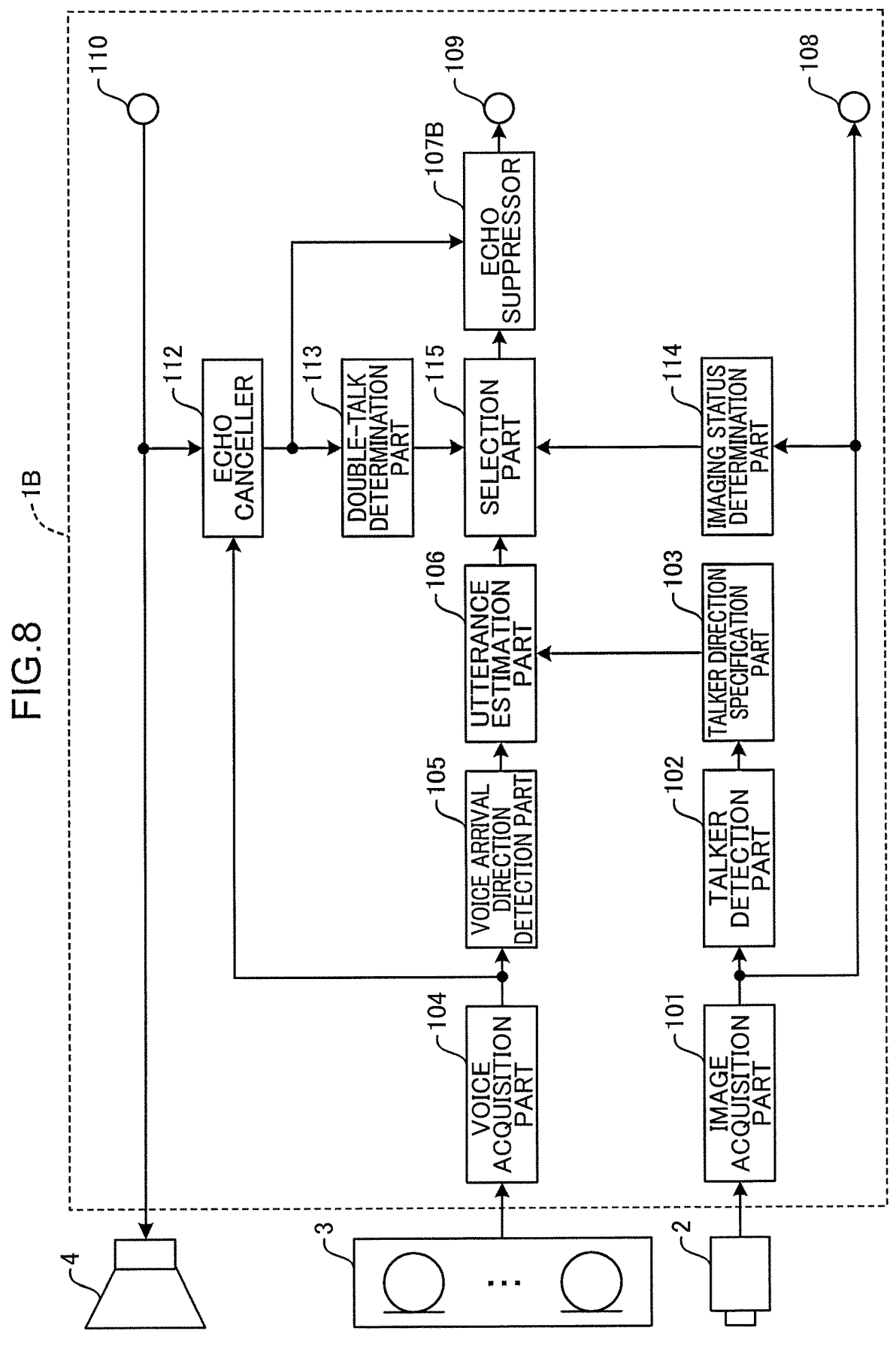
FIG. 8 is a diagram illustrating a configuration of a call device in a third embodiment of the present disclosure.

FIG. 8 is a diagram illustrating a configuration of the call device in the third embodiment of the present disclosure.

The call device illustrated in FIG. 8 includes a voice signal processing device 1B, a camera 2, a microphone array 3, and a speaker 4. In the third embodiment, the same components as those in the first embodiment will be denoted by the same reference signs as those in the first embodiment, and description thereof will be omitted.

The voice signal processing device 1B includes an image acquisition part 101, a talker detection part 102, a talker direction specification part 103, a voice acquisition part 104, a voice arrival direction detection part 105, an utterance estimation part 106, an echo suppressor 107B, an image output part 108, a voice output part 109, a voice input part 110, an echo canceller 112, a double-talk determination part 113, an imaging status determination part 114, and a selection part 115.

The echo canceller 112 generates a pseudo echo signal indicating a component of a reception signal included in the voice signal using the reception signal output to the speaker 4, and cancels an acoustic echo component of the voice signal using the generated pseudo echo signal. The echo canceller 112 outputs the voice signal in which the acoustic echo component has been cancelled to the double-talk determination part 113 and the echo suppressor 107B.

The echo canceller 112 is a technique of estimating a pseudo echo signal with an adaptive filter and removing an acoustic echo by subtracting the estimated pseudo echo signal from the voice signal collected by the microphone array 3. The acoustic echo is superposition of a direct sound and a reflected sound of an amplified sound from the speaker 4. Therefore, a transfer characteristic between the speaker 4 and the microphone array 3 can be expressed by a finite impulse response (FIR) filter. The FIR adaptive filter performs learning so as to approximate a transfer characteristic, and performs convolution on a filter coefficient into a reception signal to generate a pseudo echo signal that is an estimation value of an acoustic echo. As a learning algorithm of the adaptive filter, a least mean square (LMS) method, a normalized LMS (NLMS) method, a method based on independent component analysis (ICA), and the like have been proposed.

The echo suppressor 107B adjusts the level of the voice signal in which the acoustic echo component has been canceled by the echo canceller 112, based on the set amplification factor.

The double-talk determination part 113 determines whether double talk has occurred, based on the voice signal in which the acoustic echo component has been canceled by the echo canceller 112. The double-talk determination part 113 calculates a ratio of the level of an output signal from the microphone array 3 to the level of a reception signal from a far-end talker. In a case where the ratio is greater than a predetermined threshold, the double-talk determination part 113 determines that double talk has occurred because the voice from a near-end talker is present. In a case where the ratio is smaller than the predetermined threshold, the double-talk determination part 113 determines that double talk has not occurred because a voice from the near-end talker is not present.

Note that in a case where there is no voice from the near-end talker, the acoustic echo is canceled with high accuracy, and thus the power of a residual echo tends to decrease. In a case where there is a voice from the near-end talker, the power of the residual echo tends to increase. Therefore, the double-talk determination part 113 may monitor the power of the residual echo of the echo canceller 112, determine that the voice from the near-end talker is present and double talk occurs when the power of the residual echo increases, and determine that the voice from the near-end talker does not exist and double talk does not occur when the power of the residual echo does not increase.

The imaging status determination part 114 determines whether the imaging status of the camera 2 is good. More specifically, the imaging status determination part 114 calculates average luminance of an acquired image. The imaging status determination part 114 determines that the imaging status of the camera 2 is good in a case where the average luminance of the acquired image is equal to or greater than the threshold, and determines that the imaging status of the camera 2 is not good in a case where the average luminance of the acquired image is lower than the threshold.

Note that the imaging status determination part 114 may calculate a contrast of an acquired image. The contrast is expressed by, for example, (maximum luminance value Lmax−minimum luminance value Lmin)/(maximum luminance value Lmax+minimum luminance value Lmin). The imaging status determination part 114 may determine that the imaging status of the camera 2 is good in a case where the contrast of the acquired image is equal to or greater than a threshold, and may determine that the imaging status of the camera 2 is not good in a case where the contrast of the acquired image is lower than the threshold. Further, the imaging status determination part 114 may determine whether the acquired image is an image of backlight. The imaging status determination part 114 may determine that the imaging status of the camera 2 is good in a case where the acquired image is not an image of backlight, and may determine that the imaging status of the camera 2 is not good in a case where the acquired image is an image of backlight.

Further, the talker detection part 102 may calculate detection reliability at a time of detecting the talker. The imaging status determination part 114 determines that the imaging status of the camera 2 is good in a case where the detection reliability of the talker is equal to or greater than a threshold, and determines that the imaging status of the camera 2 is not good in a case where the detection reliability of the talker is smaller than the threshold.

In a case where the imaging status determination part 114 determines that the imaging status is good, the selection part 115 selects an estimation result as to whether the near-end talker is uttering from the utterance estimation part 106. Further, in a case where the imaging status determination part 114 determines that the imaging status is not good, the selection part 115 selects a determination result of the occurrence of double talk from the double-talk determination part 113.

In a case where the selection part 115 selects the estimation result obtained by the utterance estimation part 106 and the near-end talker is estimated to be uttering, the echo suppressor 107B sets the amplification factor of the voice signal to a value equal to or greater than 1. In a case where the selection part 115 selects the determination result obtained by the double-talk determination part 113 and double talk is determined to have occurred, the echo suppressor 107B sets the amplification factor of the voice signal to a value equal to or greater than 1. In a case where the selection part 115 selects the estimation result obtained by the utterance estimation part 106 and the near-end talker is estimated not to be uttering, the echo suppressor 107B sets the amplification factor of the voice signal to a value smaller than 1. Further, in a case where the selection part 115 selects the determination result obtained by the double-talk determination part 113 and double talk is determined not to have occurred, the echo suppressor 107B sets the amplification factor of the voice signal to a value smaller than 1.

Next, an operation of the voice signal processing device 1B in the third embodiment of the present disclosure will be described.

Figure 10:
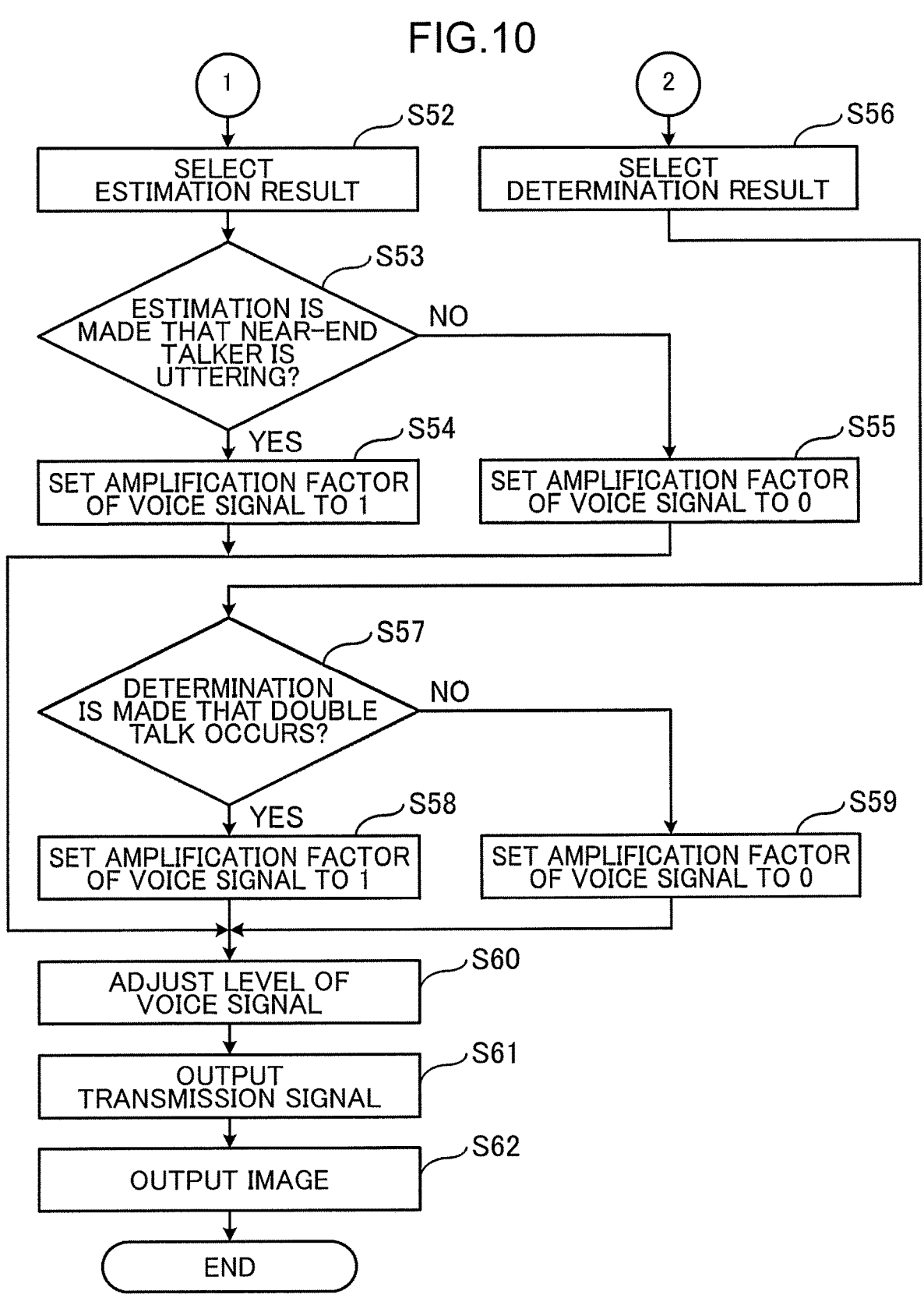
FIG. 10 is a second flowchart for describing the operation of the voice signal processing device in the third embodiment of the present disclosure.

FIG. 9 is a first flowchart for describing the operation of the voice signal processing device 1B in the third embodiment of the present disclosure, and FIG. 10 is a second flowchart for describing the operation of the voice signal processing device 1B in the third embodiment of the present disclosure.

Processing in steps S41 to S48 illustrated in FIG. 9 is the same as the processing in steps S1 to S7, and S9 illustrated in FIG. 4, and thus will be omitted from description.

Next, in step S49, the echo canceller 112 generates, using a reception signal output to the speaker 4, a pseudo echo signal indicating a component of the reception signal included in the voice signal acquired by the voice acquisition part 104, and cancels an acoustic echo component of the voice signal using the generated pseudo echo signal.

Next, in step S50, the double-talk determination part 113 determines whether double talk has occurred, based on the voice signal in which the acoustic echo component has been canceled by the echo canceller 112.

In step S51, the imaging status determination part 114 determines whether the imaging status of the camera 2 is good.

In a case where the imaging status is determined to be good (YES in step S51), in step S52, the selection part 115 selects the estimation result as to whether the near-end talker is uttering from the utterance estimation part 106.

Next, in step S53, the echo suppressor 107B determines whether the utterance estimation part 106 estimates whether the near-end talker is estimated to be uttering.

Here, in a case where the near-end talker is estimated to be uttering (YES in step S53), in step S54, the echo suppressor 107B sets the amplification factor of the voice signal to 1.

On the other hand, in a case where the near-end talker is estimated not to be uttering (NO in step S53), in step S55, the echo suppressor 107B sets the amplification factor of the voice signal to 0.

Further, in a case where the imaging status is determined not to be good (NO in step S51), in step S56 the selection part 115 selects a determination result of the occurrence of double talk from the double-talk determination part 113.

Next, in step S57, the echo suppressor 107B determines whether the double-talk determination part 113 determines that double talk has occurred.

Here, in a case where the double talk is determined to have occurred (YES in step S57), in step S58, the echo suppressor 107B sets the amplification factor of the voice signal to 1.

On the other hand, in a case where the double talk is determined not to have occurred (NO in step S57), in step S58, the echo suppressor 107B sets the amplification factor of the voice signal to 0.

Next, in step S60, the echo suppressor 107B adjusts the level of the voice signal based on the set amplification factor.

Note that processing in steps S60 to S62 illustrated in FIG. 10 is the same as the processing in steps S11 to S13 illustrated in FIG. 4, and thus will be omitted from description. Note that the image output process by the image output part 108 in step S62 may be omitted.

In such a manner, the echo canceller 112 generates, using a reception signal output to the speaker 4, the pseudo echo signal indicating the component of the reception signal included in the voice signal, and cancels an acoustic echo component of the voice signal using the generated pseudo echo signal. Then, based on the set amplification factor, the level of the voice signal in which the acoustic echo component has been canceled by the echo canceller 112 is adjusted. Therefore, the acoustic echo component of the voice signal can be canceled by the echo canceller 112, and the acoustic echo can be suppressed more reliably.

If the imaging status of the camera 2 is good, the accuracy of detecting the near-end talker from the image is high, and if the imaging status of the camera 2 is not good, the accuracy of detecting the near-end talker from the image is low. Therefore, if the imaging status of the camera 2 is good, the amplification factor of the voice signal is set based on the estimation result using an image by the utterance estimation part 106 as to whether the near-end talker is uttering, and if the imaging status of the camera 2 is not good, the amplification factor of the voice signal is set based on the determination result without using the image by the double-talk determination part 113 as to whether double talk has occurred. Therefore, the acoustic echo can be suppressed regardless of whether the imaging status of the camera 2 is good.

Fourth Embodiment

In the fourth embodiment, the call device of the first embodiment further includes the beamformer of the second embodiment and the echo canceller of the third embodiment.

Figure 11:
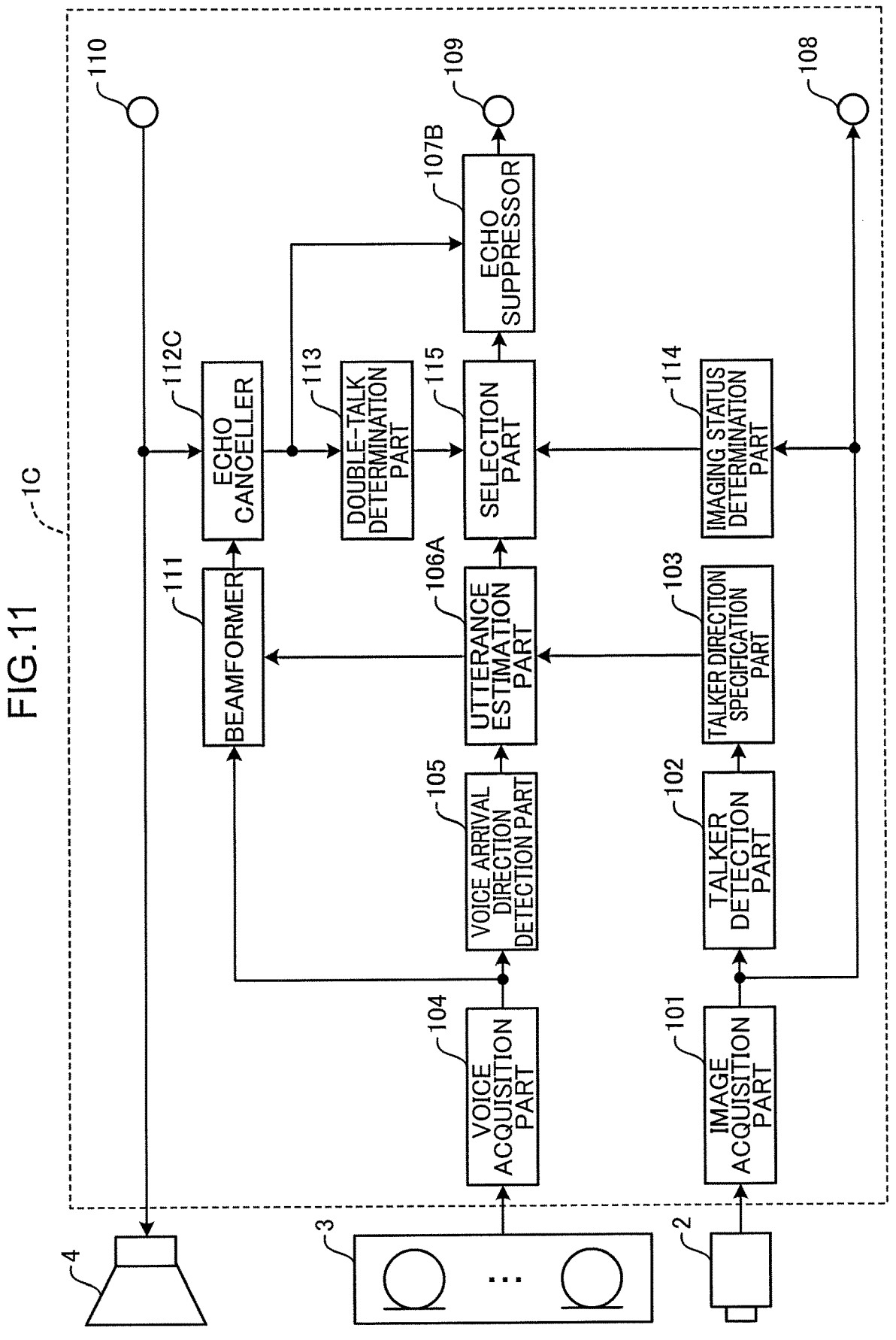
FIG. 11 is a diagram illustrating a configuration of a call device in a fourth embodiment of the present disclosure.

FIG. 11 is a diagram illustrating a configuration of the call device in the fourth embodiment of the present disclosure.

The call device illustrated in FIG. 11 includes a voice signal processing device 1C, a camera 2, a microphone array 3, and a speaker 4. In the fourth embodiment, the same components as those in the first to third embodiments will be denoted by the same reference signs as those in the first to third embodiments, and description thereof will be omitted.

The voice signal processing device 1C includes an image acquisition part 101, a talker detection part 102, a talker direction specification part 103, a voice acquisition part 104, a voice arrival direction detection part 105, an utterance estimation part 106A, an echo suppressor 107B, an image output part 108, a voice output part 109, a voice input part 110, a beamformer 111, an echo canceller 112C, a double-talk determination part 113, an imaging status determination part 114, and a selection part 115.

The echo canceller 112C generates, using a reception signal output to the speaker 4, a pseudo echo signal indicating a component of the reception signal included in a voice signal output from the beamformer 111, and cancels an acoustic echo component of the voice signal using the generated pseudo echo signal.

Next, an operation of the voice signal processing device 1C in the fourth embodiment of the present disclosure will be described.

Figure 12:
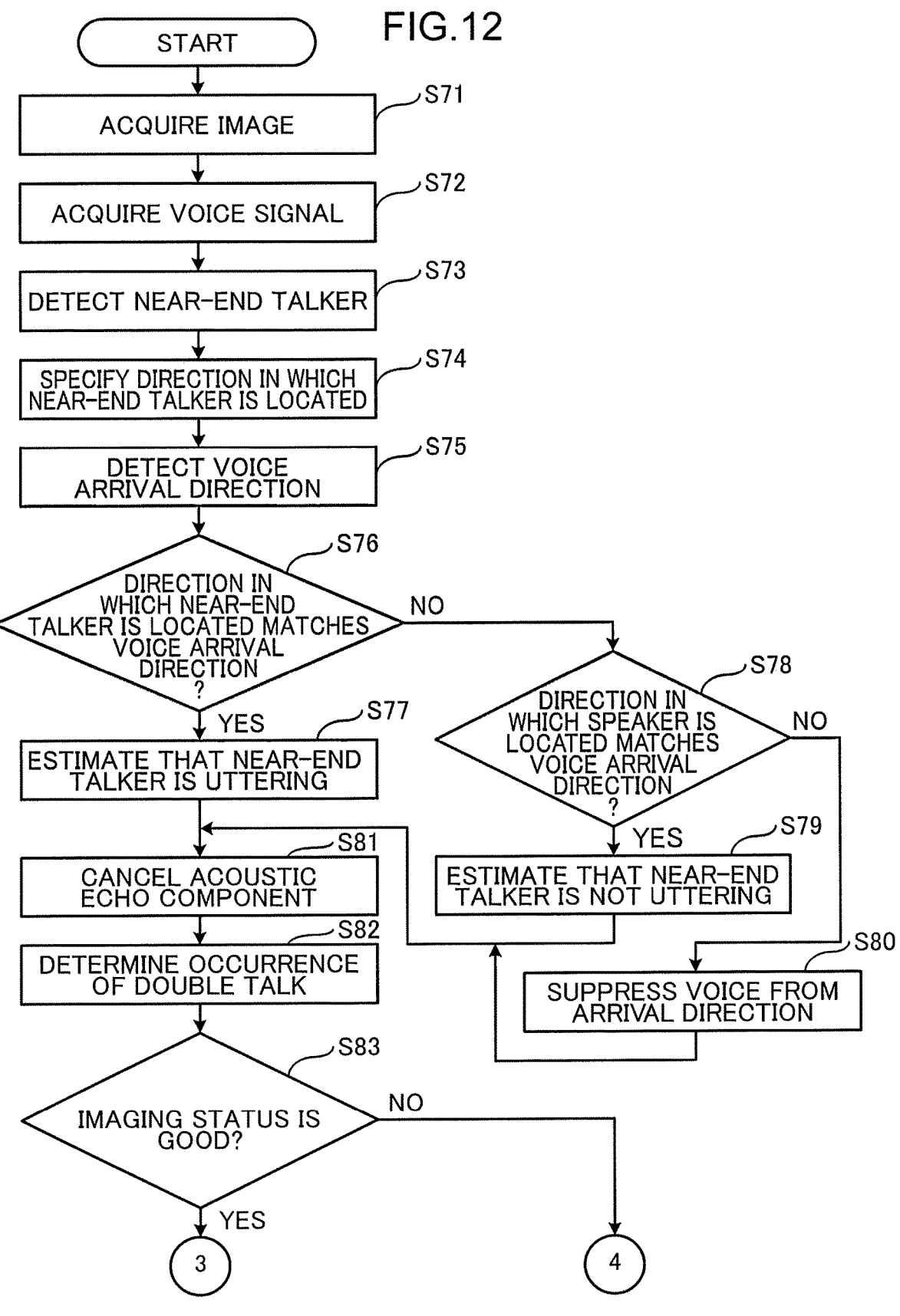
FIG. 12 is a first flowchart for describing an operation of a voice signal processing device in the fourth embodiment of the present disclosure.
Figure 13:
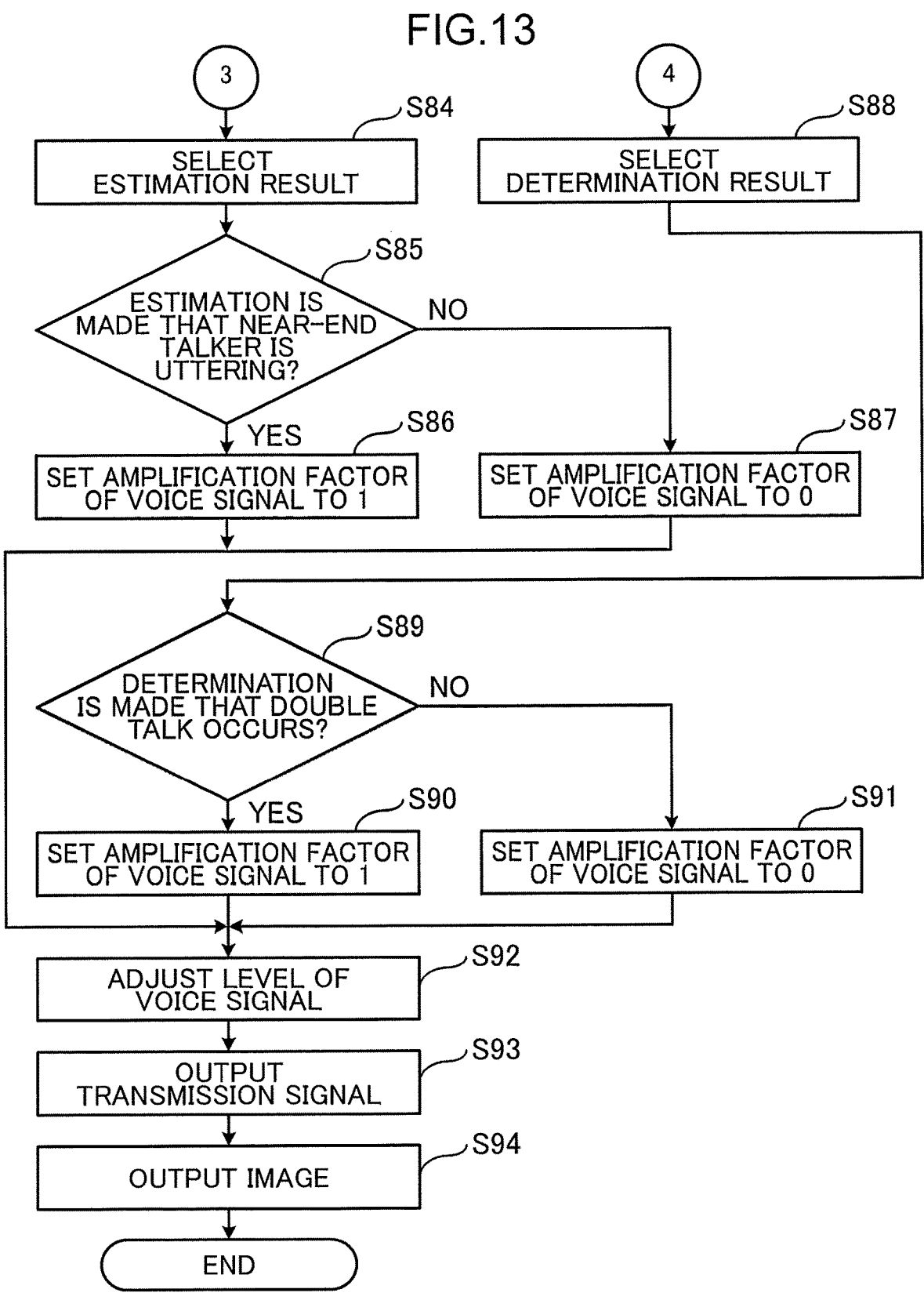
FIG. 13 is a second flowchart for describing the operation of the voice signal processing device in the fourth embodiment of the present disclosure.

FIG. 12 is a first flowchart for describing the operation of the voice signal processing device 1C in the fourth embodiment of the present disclosure, and FIG. 13 is a second flowchart for describing the operation of the voice signal processing device 1C in the fourth embodiment of the present disclosure.

Processing in steps S71 to S80 illustrated in FIG. 12 is the same as the processing in steps S21 to S27, S29, S30, and S32 illustrated in FIG. 7, and thus will be omitted from description.

Note that, between steps S77 and S81, the beamformer 111 may emphasize a voice from an arrival direction.

Next, in step S81, the echo canceller 112C generates, using the reception signal output to the speaker 4, the pseudo echo signal indicating the component of the reception signal included in the voice signal output from the beamformer 111, and cancels an acoustic echo component of the voice signal using the generated pseudo echo signal.

Processing in steps S82 to S94 illustrated in FIGS. 12 and 13 is the same as the processing in steps S50 to S62 illustrated in FIGS. 9 and 10, and thus will be omitted from description. Note that the image output process by the image output part 108 in step S94 may be omitted.

In the first to fourth embodiments, the talker detection part 102 may detect a near-end talker included in the image acquired by the image acquisition part 101 and detect a movement of a mouth of the near-end talker. The talker direction specification part 103 may specify a direction in which the near-end talker whose movement of the mouth is detected is located.

In each of the above embodiments, each component may be configured by dedicated hardware, or may be implemented by executing a software program suitable for each component. Each component may be implemented by a program execution part, such as a central processing unit (CPU) or a processor, reading and executing a software program recorded in a recording medium such as a hard disk or a semiconductor memory. Alternatively, the program may be executed by another independent computer system by recording and transferring the program on a recording medium or transferring the program via a network.

Some or all of the functions of the devices according to the embodiments of the present disclosure are implemented as large scale integration (LSI), which is typically an integrated circuit. These functions may be individually integrated into one chip, or may be integrated into one chip so as to include some or all functions. Circuit integration is not limited to LSI, and may be implemented by a dedicated circuit or a general-purpose processor. Available examples include a field programmable gate array (FPGA) that can be programmed after manufacturing of LSI, and a reconfigurable processor in which connections and settings of circuit cells inside LSI can be reconfigured.

Some or all of the functions of the devices according to the embodiments of the present disclosure may be implemented by executing a program with a processor such as a CPU.

The numbers used above are merely examples for specifically describing the present disclosure, and the present disclosure is not limited to the illustrated numbers.

The order in which each step illustrated in the above flowcharts is performed is for specifically describing the present disclosure, and may be an order other than the above order as long as a similar effect can be obtained. Some of the above steps may be executed simultaneously (in parallel) with other steps.

Since the technique according to the present disclosure can reliably suppress an acoustic echo, and thus is useful as a technique for processing a voice signal acquired by a microphone array.

The invention claimed is:

1. A voice signal processing device comprising: an image acquisition part that acquires an image captured by a camera; a talker detection part that detects a near-end talker included in the image; a talker direction specification part that specifies a direction in which the detected near-end talker is located; a voice acquisition part that acquires a voice signal collected by a microphone array including a plurality of microphones; a voice arrival direction detection part that detects a voice arrival direction based on the voice signal; an utterance estimation part that estimates whether the near-end talker is uttering, based on the direction in which the near-end talker is located and the voice arrival direction; a level adjustment part that sets an amplification factor of the voice signal to a value equal to or greater than 1 in a case where the near-end talker is estimated to be uttering, sets the amplification factor of the voice signal to a value smaller than 1 in a case where the near-end talker is estimated not to be uttering, and adjusts a level of the voice signal based on the set amplification factor; and an output part that outputs the adjusted voice signal as a transmission signal to be transmitted to a far-end talker.

2. The voice signal processing device according to claim 1, wherein the utterance estimation part determines whether the direction in which the near-end talker is located matches the voice arrival direction, estimates that the near-end talker is uttering in a case where the direction in which the near-end talker is located matches the voice arrival direction, and estimates that the near-end talker is not uttering in a case where the direction in which the near-end talker is located does not match the voice arrival direction.

3. The voice signal processing device according to claim 2, wherein the utterance estimation part determines whether a direction in which a speaker that outputs a reception signal from the far-end talker is located matches the voice arrival direction in a case where the direction in which the near-end talker is located does not match the voice arrival direction, and estimates that the near-end talker is not uttering in a case where the direction in which the speaker is located matches the voice arrival direction.

4. The voice signal processing device according to claim 3, further comprising: a beamformer that suppresses a sound from a specific direction, wherein the utterance estimation part estimates that the voice is a noise in the case where the direction in which the speaker is located does not match the voice arrival direction, and the beamformer suppress the voice from the arrival direction in a case where the voice is estimated to be a noise.

5. The voice signal processing device according to claim 3, further comprising: a beamformer that emphasizes a sound from a specific direction, wherein the beamformer emphasizes the voice from the arrival direction in the case where the near-end talker is estimated to be uttering.

6. The voice signal processing device according to claim 1, further comprising: an echo canceller that generates, using a reception signal output to the speaker, a pseudo echo signal indicating a component of the reception signal included in the voice signal, and cancels an acoustic echo component of the voice signal using the generated pseudo echo signal, wherein the level adjustment part adjusts a level of the voice signal in which the acoustic echo component has been canceled by the echo canceller, based on the set amplification factor.

7. The voice signal processing device according to claim 6, further comprising:

an imaging status determination part that determines whether an imaging status of the camera is good;

a double-talk determination part that determines whether double talk has occurred, based on the voice signal in which the acoustic echo component has been canceled by the echo canceller; and a selection part that selects an estimation result by the utterance estimation part as to whether the near-end talker is uttering in a case where the imaging status is determined to be good, and selects a determination result by the double-talk determination part as to whether double talk has occurred in a case where the imaging status is determined not to be good, wherein the level adjustment part sets the amplification factor of the voice signal to a value equal to or greater than 1, in a case where the estimation result by the utterance estimation part is selected and the near-end talker is estimated to be uttering or in a case where the determination result by the double-talk determination part is selected and the double talk is determined to have occurred, and sets the amplification factor of the voice signal to a value smaller than 1, in a case where the estimation result by the utterance estimation part is selected and the near-end talker is estimated not to be uttering or in a case where the determination result by the double-talk determination part is selected and the double talk is determined not to have occurred.

8. The voice signal processing device according to claim 1, wherein the talker detection part detects the near-end talker included in the image and detects a movement of a mouth of the near-end talker, and the talker direction specification part specifies a direction in which the near-end talker whose movement of the mouth has been detected is located.

9. A voice signal processing method comprising:

by a computer, acquiring an image captured by a camera;

detecting a near-end talker included in the image;

specifying a direction in which the detected near-end talker is located;

acquiring a voice signal collected by a microphone array including a plurality of microphones;

detecting a voice arrival direction based on the voice signal;

estimating whether the near-end talker is uttering, based on the direction in which the near-end talker is located and the voice arrival direction;

setting an amplification factor of the voice signal to a value equal to or greater than 1 in a case where the near-end talker is estimated to be uttering, and setting the amplification factor of the voice signal to a value smaller than 1 in a case where the near-end talker is estimated not to be uttering, and adjusting a level of the voice signal based on the set amplification factor; and outputting the adjusted voice signal as a transmission signal to be transmitted to a far-end talker.

10. A non-transitory computer readable recording medium storing a voice signal processing program for causing a computer to function as:

an image acquisition part that acquires an image captured by a camera;

a talker detection part that detects a near-end talker included in the image;

a talker direction specification part that specifies a direction in which the detected near-end talker is located;

a voice acquisition part that acquires a voice signal collected by a microphone array including a plurality of microphones;

a voice arrival direction detection part that detects a voice arrival direction based on the voice signal;

an utterance estimation part that estimates whether the near-end talker is uttering, based on the direction in which the near-end talker is located and the voice arrival direction;

a level adjustment part that sets an amplification factor of the voice signal to a value equal to or greater than 1 in a case where the near-end talker is estimated to be uttering, sets the amplification factor of the voice signal to a value smaller than 1 in a case where the near-end talker is estimated not to be uttering, and adjusts a level of the voice signal based on the set amplification factor; and an output part that outputs the adjusted voice signal as a transmission signal to be transmitted to a far-end talker.

\* \* \* \* \*